(12) United States Patent
Fischer et al.

(10) Patent No.: US 12,130,212 B2
(45) Date of Patent: Oct. 29, 2024

(54) ROCKET LAUNCH ACCELERATION TESTING MACHINES

(71) Applicant: Omnitek Partners LLC, Ronkonkoma, NY (US)

(72) Inventors: Jacques Fischer, Sound Beach, NY (US); Jahangir S Rastegar, Stony Brook, NY (US)

(73) Assignee: OMNITEK PARTNERS L.L.C., Ronkonkoma, NY (US)

( * ) Notice: Subject to any disclaimer, the term of this patent is extended or adjusted under 35 U.S.C. 154(b) by 0 days.

(21) Appl. No.: 17/573,604

(22) Filed: Jan. 11, 2022

(65) Prior Publication Data
US 2022/0299400 A1   Sep. 22, 2022

Related U.S. Application Data

(60) Provisional application No. 63/136,064, filed on Jan. 11, 2021.

(51) Int. Cl.
| | |
|---|---|
| *G01N 3/31* | (2006.01) |
| *G01M 7/08* | (2006.01) |
| *G01N 3/30* | (2006.01) |
| *G01N 3/317* | (2006.01) |

(52) U.S. Cl.
CPC .............. *G01M 7/08* (2013.01); *G01N 3/30* (2013.01); *G01N 3/31* (2013.01)

(58) Field of Classification Search
None
See application file for complete search history.

(56) References Cited

U.S. PATENT DOCUMENTS

| | | | | | |
|---|---|---|---|---|---|
| 4,020,672 | A | * | 5/1977 | Safford | G01N 3/32 |
| | | | | | 73/12.06 |
| 2016/0258837 | A1 | * | 9/2016 | Rastegar | G01N 3/307 |

FOREIGN PATENT DOCUMENTS

| | | | | | |
|---|---|---|---|---|---|
| CN | 106768782 | A | * | 5/2017 | ............. G01M 7/08 |
| CN | 108414180 | A | * | 8/2018 | ............. G01M 7/08 |
| CN | 108489698 | A | * | 9/2018 | ............. G01M 7/08 |
| GB | 2126354 | A | * | 3/1984 | ............. G01N 3/317 |
| KR | 101384499 | B1 | * | 4/2014 | |
| SU | 839831 | A1 | * | 6/1981 | |

* cited by examiner

*Primary Examiner* — Jill E Culler
*Assistant Examiner* — Ruben C Parco, Jr.

(57) ABSTRACT

A shock testing machine including: a carriage for holding a component to be tested, the carriage being configured to be movable in a linear direction along one or more elongated rails; a drum rotatable on a shaft, the drum having a circumferential surface; a cable having one end connected to the carriage and an other end connected to the drum; a motor having an output connected to the shaft to rotate the drum under the motive power of the motor to wind the cable on the circumferential surface of the drum; and a clutch disposed in a power train operatively connecting the motor to the drum, the clutch having a disengaged state and an engaged state. Where the motor is controlled to disengage the clutch while the motor reaches a predetermined rotational speed or predetermined rotational torque and to engage the clutch when the motor reaches the predetermined rotational speed or predetermined rotational torque to accelerate the carriage and component to be tested in the linear direction.

3 Claims, 17 Drawing Sheets

ROCKET LAUNCH ACCELERATION TESTING MACHINES

CROSS-REFERENCE TO RELATED APPLICATION

This application claims the benefit of U.S. Provisional Application 63/136,064, filed on Jan. 11, 2021, the entire contents of which is incorporated herein by reference.

BACKGROUND

1. Field

The present disclosure relates generally to machines that generate acceleration profiles like those experienced by many rockets during their launch and that are used for testing the performance of the various components of the rocket when subjected to the launch acceleration, and more particularly to low-cost and fast set-up and reusable testing machines and methods capable of imposing high accelerations that are sustained over long durations (even over >100 msec). Such machine would provide the means for testing ordnance and commercial products/components under such high-G shock loadings.

2. Prior Art

Gun-fired munitions, mortars and rail-gun munitions are subjected to high-G (setback and set-forward) acceleration during launch and target impact. Rockets are generally subjected to lower G launch accelerations but for significantly longer durations. High-G accelerations are also experienced during impact in munitions and in many other devices during their planned operation. Similar but more complex combinations of axial as well as lateral and bending shock loadings are experienced by air dropped weapons as they impact the target, particularly when the weapon is rocket assisted to achieve high impact velocities and when the target structure is highly heterogeneous, such as reinforced concrete or soil with large rock content. As a result, all components of the system and the system itself must survive such shock loading events and be qualified to such severe environments. High-G loading is also experienced by almost all objects during accidental drop or other similar accidental events.

Component qualification testing cannot obviously be done in an actual environment on complete assemblies. In addition to prohibitive cost involved, testing of components in actual environments would not provide the required information for determining the required component and system design margins. For these reasons, laboratory simulations of the rocket launch acceleration and other shock loading environments are highly desirable for testing individual components, subassemblies and sometimes the complete system assembly.

In the current state of the art, shock loading environments are simulated in the industry by one of the following methods:

1. Electro-Dynamic Shaker.

This method can accurately produce a desired shock response spectrum (SRS) within closely specified tolerances, but amplitude and frequency limitations of the equipment greatly restrict its applicability.

2. Live Ordnance with System Structure.

Since the actual system structure and live ordnance are used, this method has the potential to produce a shock virtually identical to the expected field environment. The cost of the test structure, however, is usually prohibitive, unless large numbers of identical tests are to be conducted. The use of live ordnance may have a wide repeatability tolerance and does not easily allow the test levels to be increased so that an adequate design margin can be assured. For the case of gun-fired munitions, mortars and the like, the added problem is the "soft" recovery of the launched round to examine the state of the components being tested. In certain case, telemetry of data may be used to transmit back data related to the operation of certain components. However, in most cases it is highly desirable to examine the state of the components post firing. In addition, in many cases it is extremely difficult if not impossible to measure/determine the effect of shock loading on many components for transmission to a ground station via telemetry.

3. Live Ordnance with Mock Structure.

This method has most of the same features as the method "2" above, except that some cost savings are attributed to the use of a mass mock-up structure. These savings may be negated by the need for some trial-and-error testing to attain the desired component input, where geometric similarity was used in method "2" above to attain the same result. This method also suffers from the same shortcomings for testing components of gun-fired munitions and mortars and the like as indicated for the above method "2".

4. Live Ordnance with Resonant Fixture.

This method further reduces test cost, and is a candidate for general purpose testing, due to the use of a generic resonant plate fixture. Since live ordnance is used, all the very high frequencies associated with near-field pyrotechnic shock events are produced with this method. However, a great amount of trial-and-error testing may be required to obtain the desired component input.

5. Mechanical Impact with Mock Structure.

Mechanical impacts do not produce the high frequencies associated with the stress pulse in the immediate vicinity of a pyrotechnic device. However, most components in a typical system are isolated by enough intermediary structure such that the shock at the component location is not dominated by these high frequencies. Instead, the shock at the component is dominated by the structural response to the pyrotechnic device and has dominant frequencies which are typically less than 10 KHz. For these components, a mechanical impact (e.g., using a projectile or pendulum hammer) can produce a good simulation of the pyrotechnic shock environment. Test amplitudes can easily be increased or decreased by simply increasing or decreasing the impact speed. The shock level and duration can be controlled to some extent using various pads affixed at the point of impact. According to this method, attempt is made to subject the structure containing the test components to the said impact induced acceleration (shock) profile, which close to that experienced when assembled in the actual system. The test conditions are experimentally adjusted to achieve an approximation of the actual acceleration (shock) profile. In general, many trial-and-error runs have to be made to achieve an acceptable acceleration (shock) profile. The characteristics and response of the various pads used at the impact point to increase the duration of the shock (acceleration) event is generally highly variable and dependent on temperature and moisture. In addition, due to inherent design of such mechanical impact machines and the limitations on the thickness of the pads that can be used at the impact point, high G acceleration peaks with long enough duration like those, e.g., experienced by munitions fired large caliber guns or mortars, cannot be achieved. For example, to achieve a peak shock acceleration level of 5000 G with a duration of 4 milliseconds, the said pad deformation must be well over 0.6 meters (considering a reasonable ramp-up and ramp-down of 0.1 meters each), which is highly impractical. It is also appreciated by those skilled in the art that for simulating firing (setback) acceleration for most gun-fired munitions and mortars, the peak acceleration levels can generally be well over the considered 5000 Gs with significantly longer durations. It can therefore be concluded that the described mechanical impact machines do not accurately duplicate the shock profile experienced by munitions during firing or target impact and are not suitable for accurate shock testing of components to be used in such munitions.

6. Mechanical Impact with Resonant Fixture.

In this method, a resonant fixture (typically a flat plate) is used instead of a mock structure. This significantly reduces cost and allows for general purpose testing since the fixturing is not associated with a particular structural system. The mechanical impact excites the fixture into resonance which provides the desired input to a test component mounted on the fixture. Historically, test parameters such as plate geometry, component location, impact location and impact speed have been determined in a trial-and-error fashion. In general, this method produces a simulated environment which has its energy concentrated in a relatively narrow frequency bandwidth. It should be noted here that a suitable resonant fixture for use in this method may also be a bar impacted either at the end or at some point along the length of the bar. This method is suitable for many applications in which the components are subjected to relatively long-term vibration such as those induced by the system structure. The method is, however, not suitable for testing components of gun-fired munitions and the like since in such cases the munitions is subjected primarily to a single high G setback or impact shock with relatively long duration.

7. Air-Gun Testing Platforms.

In this method, the components to be tested are usually mounted in a "piston" like housing with appropriate geometry. In one method, the said "piston" is then accelerated by the sudden release of pressurized air or accelerated by the rupture of a diaphragm behind which air pressure is continuously increased until the diaphragm is failed in sheared. In another type of air gun, a similar airtight "piston" within which the components to be tested are securely mounted is accelerated over a certain length of a tube by pressurized gasses. The "piston" is thereby accelerated at relatively slower rates and once it has gained a prescribed velocity, the "piston" existing the tube and impacts decelerating pads of proper characteristics such as aluminum honeycomb structures to achieve the desired deceleration amplitude and duration. The components are assembled inside the "piston" such that the said deceleration profile to correspond to the desired actual shock (acceleration) profile. In general, similar to the above method 5, air guns can be used to subject the test components to high G shock (acceleration) levels of over 30,000 Gs but for durations that are significantly lower than those experienced by gun-fired munitions, mortars and the like. It can therefore be concluded that the described mechanical impact machines do not accurately duplicate the shock profile experienced by munitions during firing or target impact and are not suitable for accurate shock testing of components to be used in such munitions.

8. Rocket Sleds.

Rocket sled is a test platform that slides along a set of rails, propelled by rockets. As its name implies, a rocket sled does not use wheels. Instead, it has sliding pads, called "slippers", which are curved around the head of the rails to prevent the sled from flying off the track. The rail cross-section profile is usually that of a Vignoles rail, commonly used for railroads. Rocket sleds are used extensively aerospace applications to accelerate equipment considered too experimental (hazardous) for testing directly in piloted aircraft. The equipment to be tested under high acceleration or high airspeed conditions are installed along with appropriate instrumentation, data recording and telemetry equipment on the sled. The sled is then accelerated according to the experiment's design requirements for data collection along a length of isolated, precisely level and straight test track. This system is not suitable for testing components for gun-fired munitions and mortars and the like since it can produce only around 100-200 Gs.

9. Soft Recovery System Facility (SCat Gun)

In this system, the components to be tested are packaged inside a round, which is fired by an actual gun (in the current system located at the U.S. Army Armament Research, Development and Engineering Center (ARDEC) in New Jersey, with a 155 mm round being fired by a 155 mm Howitzer weapon with a M199 gun tube and 540 feet of catch tubes). The projectile is then recovered using a "Soft Recovery" system. The soft catch component of the system uses both pressurized air and water to help slow down the projectile. The first part of the chain of catch tubes only contains atmospheric air. The next section, 320 feet of the tubes, contains pressurized air, followed by an 80 feet section that is filled with water. A small burst diaphragm seals one end of the pressurized air and a piston seals the other end. The piston also separates the water and pressurized air sections. The burst diaphragm and piston are replaced after each test fire. Once fired, the projectile achieves free flight for approximately 6 feet and travels down the catch tubes, generating shockwaves that interact with the atmospheric air section, the burst diaphragm, the pressurized air section, the piston and the water section. The air section is compressed and pushed forward, and shock and pressure cause the piston to move against the water, all while slowing the projectile to a stop. Then the piston is ejected out of the end of the system, followed by the air and water, and finally the projectile comes to rest in a mechanized brake system. On-board-recorders inside the projectile measure the accelerations of the projectile from the gun-launch and the catch events. This system is currently providing the means to subject the test components to as realistic firing shock loading conditions as possible and provide the means to retrieve the round to examine the tested components. The cost of each testing is, however, extremely high, thereby making it impractical for use for engineering development. The system is also impractical for use for most reliability testing in which hundreds and sometimes thousands of samples must be tested and individually instrumented. It also takes hours to perform each test.

The methods 1-6 described above are more fully explained in the following references: Daniel R. Raichel, "Current Methods of Simulating Pyrotechnic Shock", Pasadena, Calif.: Jet Propulsion Laboratory, California Institute of Technology, Jul. 29, 1991; Monty Bai, and Wesley Thatcher, "High G Pyrotechnic Shock Simulation Using Metal-to-Metal Impact", The Shock and Vibration Bulletin, Bulletin 49, Part 1, Washington D.C.: The Shock and Vibration Information Center, September, 1979; Neil T. Davie, "The Controlled Response of Resonating Fixtures Used to Simulate Pyroshock Environments", The Shock and Vibration Bulletin, Bulletin 56, Part 3, Washington D.C.: The Shock and Vibration Information Center, Naval Research Laboratory, August 1986; Neil T. Davie, "Pyrotechnic Shock Simulation Using the Controlled Response of a Resonating Bar Fixture", Proceedings of the Institute of Environmental Sciences 31st Annual Technical Meeting, 1985; "The Shock and Vibration Handbook", Second Edition, page 1-14, Edited by C. M. Harris and C. E. Crede, New York: McGraw-Hill Book Co., 1976; Henry N. Luhrs, "Pyroshock Testing—Past and Future", Proceedings of the Institute of Environmental Sciences 27th Annual Technical Meeting, 1981.

The currently available methods and systems for testing components to be used in systems that subject them to acceleration (shock) events have several shortcomings for use to simulate many rocket launch acceleration events with accelerations of the order of sometimes 20-40 G and durations of over 100-150 milliseconds. Firstly, most of the available methods and devices, except those that are based on actual firing of the rocket (for example, rocket sleds) or the like, cannot provide long enough acceleration duration. Secondly, those methods that are based on actual rockets or firing of the projectile from the actual gun or mortar or the like have prohibitive cost, thereby making them impractical for engineering development tasks which requires countless iterations to achieve the desired results for individual components as well as for their assemblies. In addition, reliability tests for munitions components requires testing of many components, which would make the total cost of munitions development prohibitive. Thirdly, in many component tests, it is highly desirable to instrument each component so that its behavior during the total acceleration environment can be monitored and recorded. Such instrumentation and monitoring are exceedingly difficult to achieve when the components to be tested must be assembled in a rather small volume of rocket or fired projectiles.

Developing a controllable test method and predictive capability to apply the acceleration profile experienced by a rocket or munition to the components to be tested is critical to the development of fuze, energetic, and other weapon technologies and for the development of products that can survive accidental drops or impact due to transportation vibration and the like. In munitions and other similar systems, to subject the device or system to the required acceleration events typically requires ballistic or operational testing. Both testing methods are extremely costly, personnel intensive, and introduce both technical and safety risks.

Most aircraft and satellite components, whether military or commercial, must be tested under certain shock loading conditions. That is, aircraft components must be shock tested to ensure that their design will survive its intended environment. Consequently, different aircraft components may have widely varying shock testing requirements. Currently, there is no one shock testing apparatus that can shock test aircraft components to accommodate the varying shock testing requirements for aircraft components, if at all. Thus, the industry resorts to building specialized shock testing machines or using computer simulation for shock testing, methods which are expensive and/or inaccurate.

In addition to rigorous vibration profiles, many consumer electronic components must be shock tested to determine how they will perform under certain shock conditions. Electronic components are often shock tested to determine how they will survive under unintended conditions, such as repetitive dropping. Of such consumer electronic components, device casings and circuit boards are often shock tested to determine survivability due abuse while other electronic devices are designed for heavy duty usage, such as in the construction trade and must be shock tested to determine if they are fit for their harsh environment. The current shock testing methods for consumer electronic devices have the same shortcomings as those described above regarding commercial aircraft. Current shock testing machines in the consumer electronics area are either quite simple drop testing from heights or pneumatic shock machines, both of which are inaccurate, and their repeatability is unreliable.

In addition, currently available high-G shock loading machines, even those applying relatively low accelerations levels in the range of, for example 10 G-100 G, are not capable of applying the acceleration over relatively long durations, for example 50 G over 100 milliseconds.

A configuration of a mechanical shock testing machine 10 of prior art that uses the aforementioned method "6" is shown in the schematic of FIG. 1. The schematic of FIG. 1 is intended to show only the main components of such a mechanical shock testing machine. The mechanical shock machine 10 is constructed with some type of rails 12 along which the impact mass element 11 travels. The rails (one or more) may have any cross-sectional shape and the sliding surfaces between the mass element 11 and the rails 12 may be covered with low friction material or may utilize rolling elements to minimize sliding friction. The rails 12 are generally mounted on a relatively solid and massive base 13, which in turns rests on a firm foundation 14. Certain relatively stiff shock absorbing elements (not shown) may be provided between the base 13 and the ground 14 to prevent damage to the foundation structure. In heavier machinery, a relatively large (usually made from reinforced concrete) foundation block (not shown) is used with shock isolation elements having been positioned between the said foundation block and the surrounding structure.

The components to be tested 15 are attached fixedly to the mass element 11, usually via a fixture 16. In the mechanical shock machine 10, the mass element 11 acts as a "hammer" that is designed to impact an anvil 17, FIG. 1, to impart the desired shock loading (deceleration profile in the present mechanical shock testing machine) onto the components 15 that are to be tested. The anvil 17 is generally desired to be very rigid as well as massive and be securely attached to the base 13 of the mechanical shock testing machine, FIG. 1. In many cases, the mass element 11 is provided with an impact element 18, which is designed to have a relatively sharp and hard tip 19.

To perform shock testing of the components 15, the mass element 11 ("hammer" element) is accelerated downwards in the direction of the arrow 20 towards the anvil 17. The present shock testing machines are usually installed vertically. In which case and when relatively low impact shock (deceleration) levels or very short shock durations are desired, the mass element 11 is accelerated in the direction of the arrow 20 under the gravitational acceleration, with the height of travel determining the level of velocity attained by the mass element ("hammer") at the time of impacting the anvil 17. In other mechanical shock testing machines, particularly when higher mass element 11 velocity at impact velocity is desired, other means such as pre-tensioned bungee cords or pneumatic cylinders (not shown) are also used to significantly increase downward acceleration of the mass element 11 (in the direction of the arrow 2), thereby significantly increasing the said impact speed between the mass element 11 (the "hammer" element) and the anvil 17. In those cases, in which the mechanical shock testing machine 10 is installed horizontally (not shown), the mass element 11 is accelerated in the direction of the arrow 20 by the pre-tensioned bungee cords or pneumatic cylinders or even linear motors.

The shock (deceleration) level experienced by the mass element 11 and thereby the test components 15 and its duration can be controlled to some extent by the use of various pads 21 affixed at the point of impact, i.e., between the anvil 17 surface and the impacting tip 19 of the impact element 18 of the mass element 11 ("hammer"). The shock (deceleration pulse) amplitude is also increased or decreased by simply increasing or decreasing the said impact speed. The test conditions are experimentally adjusted to achieve as close approximation of the actual acceleration (shock) profile as possible.

The isometric view of another prior art mechanical shock testing machine, indicated as the embodiment 30, is shown in FIG. 2 and the close-up view of its test carriage and platform is shown in FIG. 3. The shock testing machine 30 is horizontally installed so that it could accommodate relatively long rails as it will be described but may also be vertically installed when relatively low acceleration levels and durations are involved. The rails 31 and 32 are attached to the machine base (foundation) structure 33 (shown as ground) by rigid support structures 34 and 35. A carriage member 36 is provided with sleeve bearings 37 and 38 as shown in the cross-sectional view of FIG. 3 to travel along the rails 31 and 32 freely with minimal friction.

During shock loading test, the carriage member 36 is accelerated to a desired velocity from its right-most position in the direction of the arrow 39 as shown in FIG. 2 using bungee cords or other commonly used methods. For increased safety, a proper shock absorber 40 is provided on the rigid support structure 35 in case that the said braking elements fail to bring the carriage member 36 and the test platform 41 to which the object to be tested is attached to a stop. The carriage member 36 is provided with the pocket 44 (FIG. 3) for positioning the test platform 41. The pocket 44 may be provided with a low friction lining to allow the test platform 41 to slide inside the pocket 44 with minimal friction. The pocket 44 may also be provided with side lips (not shown) to prevent the test platform from accidentally coming out of the pocket while moving along the length of the pocket.

As can be seen in the cross-sectional view of FIG. 3, the carriage member 36 rides over the rails 31 and 32. The rails 31 and 32 are attached to the machine structure 33 by support structures. The machine structure 33 is made of heavy structural steel and is rigidly attached to a concrete slab to withstand the testing shock loading. The test platform 41 inside the pocket 44 of the carriage member 36 is used to carry the test object(s) 45.

FIG. 4 illustrates the close-up isometric view of the test carriage and platform of the mechanical shock testing machine embodiment 30 of FIG. 2 with a cut-away view of the braking mechanism section of the machine. As can be seen in the cut-away section of the FIG. 4, the test platform 41 is provided with at least one braking strip member 46, which is fixedly attached to the back of the test platform as viewed in the isometric view of FIG. 4. High friction pads 48 are then provided between the braking strip members 46 and between the braking strip members 46 and the surface of the carriage member 36 and the pressure plate 49. The section 47 of the carriage member 36 is provided for housing the braking mechanism of the shock loading machine. The pressure adjustment screws 50 are used to adjust the braking pads 48 pressure against the surfaces of the at least one braking strip member 46 to allow the friction force resisting its movement relative to the carriage member 36 to be adjusted.

To perform shock testing, the components 45 to be tested are fixedly attached to the test platform 41, FIGS. 2-4. The pressure adjustment screws 50 are then used to adjust the pressure on the braking pad 48 to the level that is needed to achieve the required friction force level on the braking strip members 46 as the test platform begins to move to the left relative to the carriage member 36. The friction force adjustment is preferably done by providing a force gage assembly (not shown) to measure friction force acting on the test platform 41 as it begins to move.

The carriage member 36 is then accelerated to a desired velocity from its right-most position in the direction of the arrow 39 as shown in FIG. 2 using the indicated bungee cords or the like. Then as can be seen in the isometric view of FIG. 3, the side 56 of the carriage member 36 reaches the stop 57 and essentially comes to a quick stop. The stop 57 is provided on the shock loading machine structure 33 and is preferably provided with a shock absorber or other kinetic energy absorbing members to prevent the carriage member 36 from bouncing back as it is brought to a stop.

The level of the force that accelerates the carriage member 36 and its duration are selected to achieve the desired carriage member velocity as the side 56 of the carriage member reaches the stop 57.

Now as the carriage member 36 comes to a stop against the stop 57, the kinetic energy stored in the test platform 41, the braking strip members 46, and the attached components 45 that are being tested (hereinafter referred to as just the test platform) would continue to move in the direction of the arrow 39, FIG. 2, since they are not affected by the stopping of the carriage member 36. However, the friction forces produced by the brake pads 48 on the braking strip members 46 would begin to decelerate the test platform 41 until it comes to a complete stop, i.e., until all its kinetic energy is converted to heat, i.e., by the work done by the friction force.

The currently available methods and systems, including the prior art systems described above, for testing components to be used in systems that subject them to acceleration (shock) events have several shortcomings for use to simulate many rocket launch acceleration events with accelerations of the order of sometimes 20-40 G and durations of over 100-150 milliseconds. The currently available methods and systems, except those that are based on actual firing of the rocket (for example, rocket sleds), cannot provide such long enough acceleration durations. In addition, those methods that are based on actual rockets or firing of the projectile from the actual gun or mortar or the like have prohibitive cost, thereby making them impractical for engineering development tasks which requires countless iterations to achieve the desired results for individual components as well as for their assemblies. Qualification and reliability tests for munitions components also require a large number of tests, which would make the total cost of munitions development prohibitive.

It is also appreciated that in many engineering development tests of various components, it is highly desirable to instrument each component so that its behavior during the total acceleration environment can be monitored and recorded. When developing intricate mechanical mechanisms and when studying modes of failure and vibration and the like, it is highly desirable, if not essential, that high-speed video recording of the components and their operation be available for analysis and implementation of corrective design changes and modifications. Such instrumentation and monitoring are exceedingly difficult to achieve when the components to be tested must be assembled in a rather small volume of rocket or fired projectiles.

SUMMARY

It is therefore an object to develop a low-cost, reusable testing method and accompanying experimental and simulation capabilities that can reproduce acceleration/time profiles representative of rocket launch as well as similar shock loading experienced by various weapon systems and commercial products. This includes the experienced acceleration amplitude for a duration.

It is also appreciated that it is critical that the shock testing system be scalable so that they would enable testing of both small and larger devices and systems. In this regard, the shock testing system can test articles ranging from fuzing and other components of rockets and circuit boards and other components for consumer electronics weighing several ounces to ordnances/components weighing several pounds.

A need therefore exists for the development of novel methods and resulting testing apparatus (acceleration profile simulating shock testing machines) for testing various rocket and other munitions components and other devices and systems that are subjected high G acceleration of the order of tens of G with relatively long duration of the order of 100 milliseconds or more. The developed methods should not be based on the use of the actual or similar platforms, for example, firing rockets carrying the test components, due to the cost and difficulty in providing full instrumentation and providing the possibility of high-speed video recording of the components being tested for analysis and observation of their behavior when subjected to the expected acceleration event. It is also appreciated that testing methods based on the actual platform, for example firing of actual rockets, would make the cost of engineering development of such components and their reliability testing, which requires testing of a large number of samples, prohibitively high.

A need therefore exists for the development of novel methods and resulting testing apparatus (acceleration profile event shock testing machines) for testing components of munitions such as rockets and other devices and systems that are subjected relatively low G acceleration (shock loading in tens of G rather than hundreds and thousands in the case of gun-fired munitions and mortars and those experienced during impact and the like) with relatively long duration, sometimes in the order of 100 milliseconds or more during the launch. The developed methods should not be based on the use of the actual or similar platforms, for example, firing rockets carrying the test components, due to the cost and difficulty in providing full instrumentation and high-speed video recording, and since it would only allow testing of a few components at a time, thereby making the cost of engineering development of such components and their reliability testing, which requires testing of a large number of samples prohibitively high.

A need also exists for novel mechanical acceleration profile event simulating shock testing machines that can provide the means of testing a large number of fully instrumented components in a relatively short time. This requires that the said mechanical shock testing machine allows rapid mounting of test components onto the test platform while allowing relatively free access to the said components, unlike the "piston" platforms used in air guns (aforementioned method "7") or inside projectiles that are gun-launched (aforementioned method "9"). It is also highly desirable that the testing machines provide the capability of high-speed video recording the components during the tests.

The novel mechanical acceleration profile event simulating shock testing machines must also provide highly predictable and repeatable shock loading (acceleration profile) for testing the intended components so that the results can be used for detailed analytical model validation and tuning; for predicting the performance of the components in actual applications; and for providing the required information for the configuration of the said components and optimization of the developed configurations.

Herein is described mechanical acceleration profile event simulating shock testing machines and the resulting shock testing machines that can subject test components and systems to long duration high G acceleration profiles (shock) events. The resulting shock testing machines are shown to address the aforementioned needs and are particularly suitable for engineering development and testing of components to be used in rockets and similar munitions and the like. The mechanical acceleration profile event simulating shock loading machines are capable of use for a wide range of accelerations and their durations.

Accordingly, mechanical acceleration profile event simulating shock testing machine are provided that can impart relatively long duration acceleration with a wide range of magnitudes on objects being tested. The mechanical acceleration profile event simulating shock testing machine provide the means of rapidly mounting and dismounting objects to be tested on the machine platform and resetting the machine for the next test. The acceleration profile (shock loading) level to be achieved is readily adjusted and measured. The components being tested can be readily instrumented and high-speed video recorded for later analysis and demonstration of their operation and performance.

BRIEF DESCRIPTION OF THE DRAWINGS

These and other features, aspects, and advantages of the apparatus of the embodiments will become better understood with regard to the following description, appended claims, and accompanying drawings where:

DETAILED DESCRIPTION

A desirable method of testing the performance of various components used in rockets during their launch is by the application of the acceleration profile experienced to those components. Embodiments of an acceleration profile event simulating shock testing machine are provided, as shown in the schematic of FIG. 5.

Figure 1:
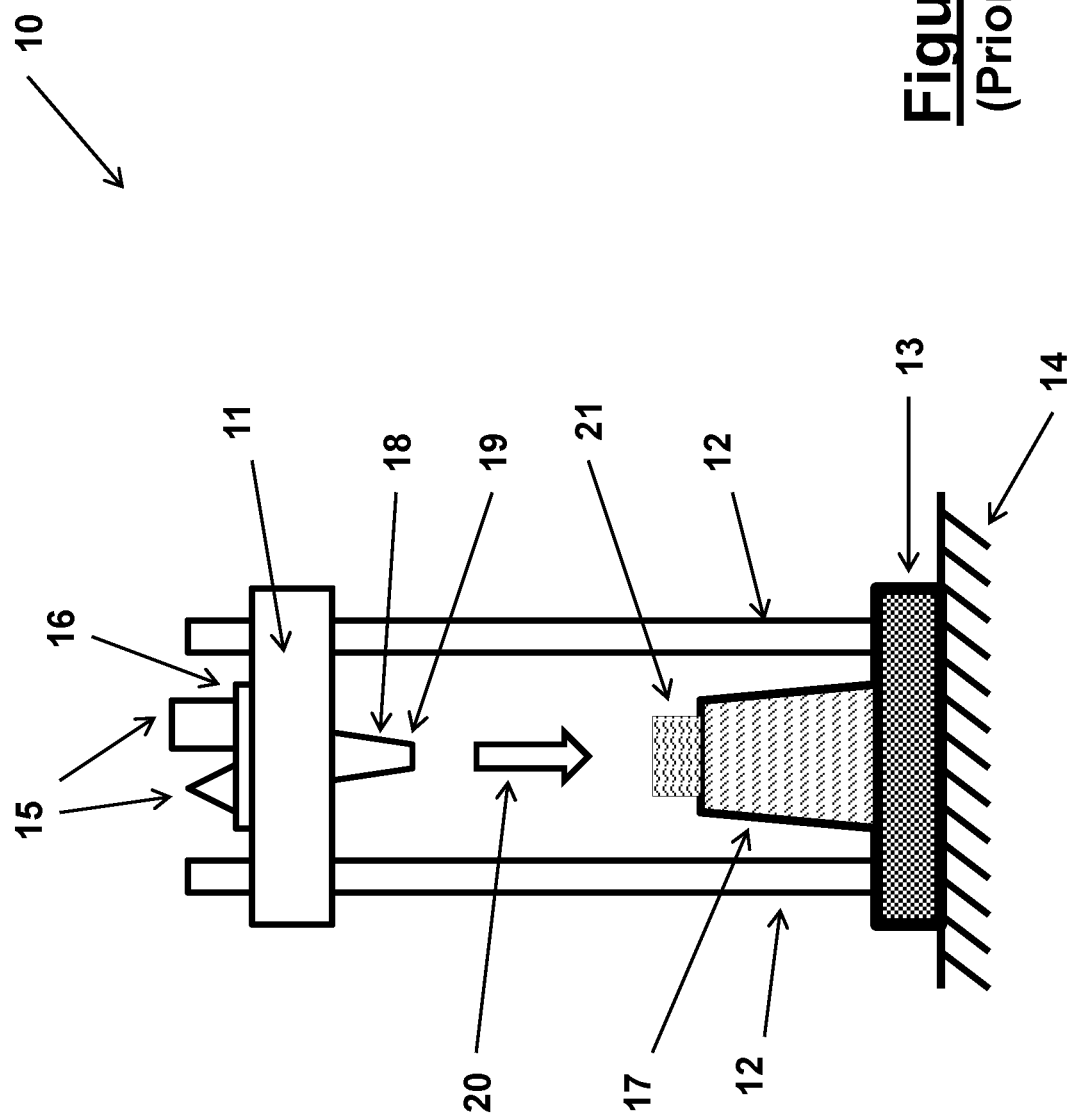
FIG. 1 illustrates a configuration of a mechanical shock testing machine of prior art.
Figure 2:
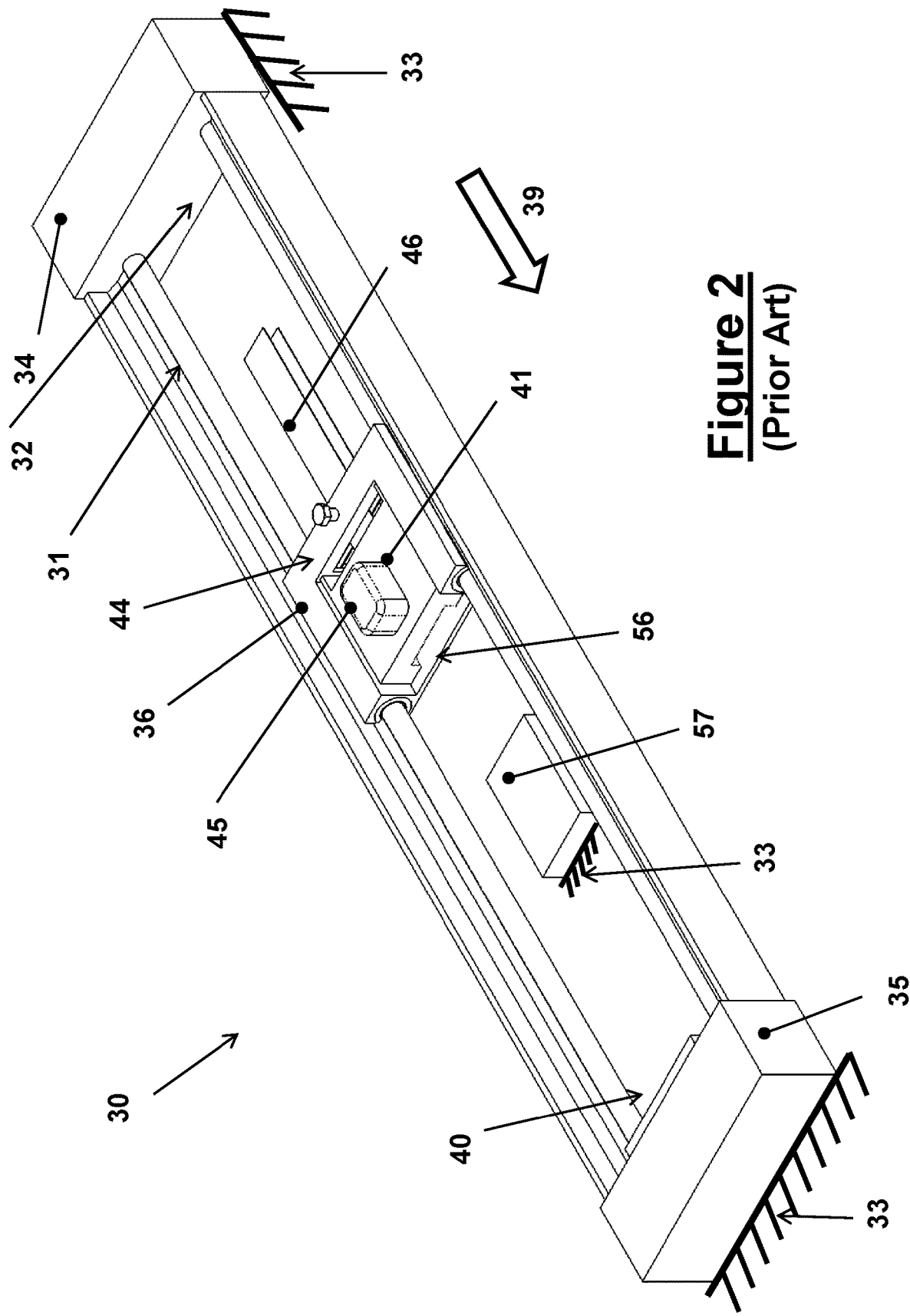
FIG. 2 illustrates the isometric view of another prior art mechanical shock testing machine.
Figure 3:
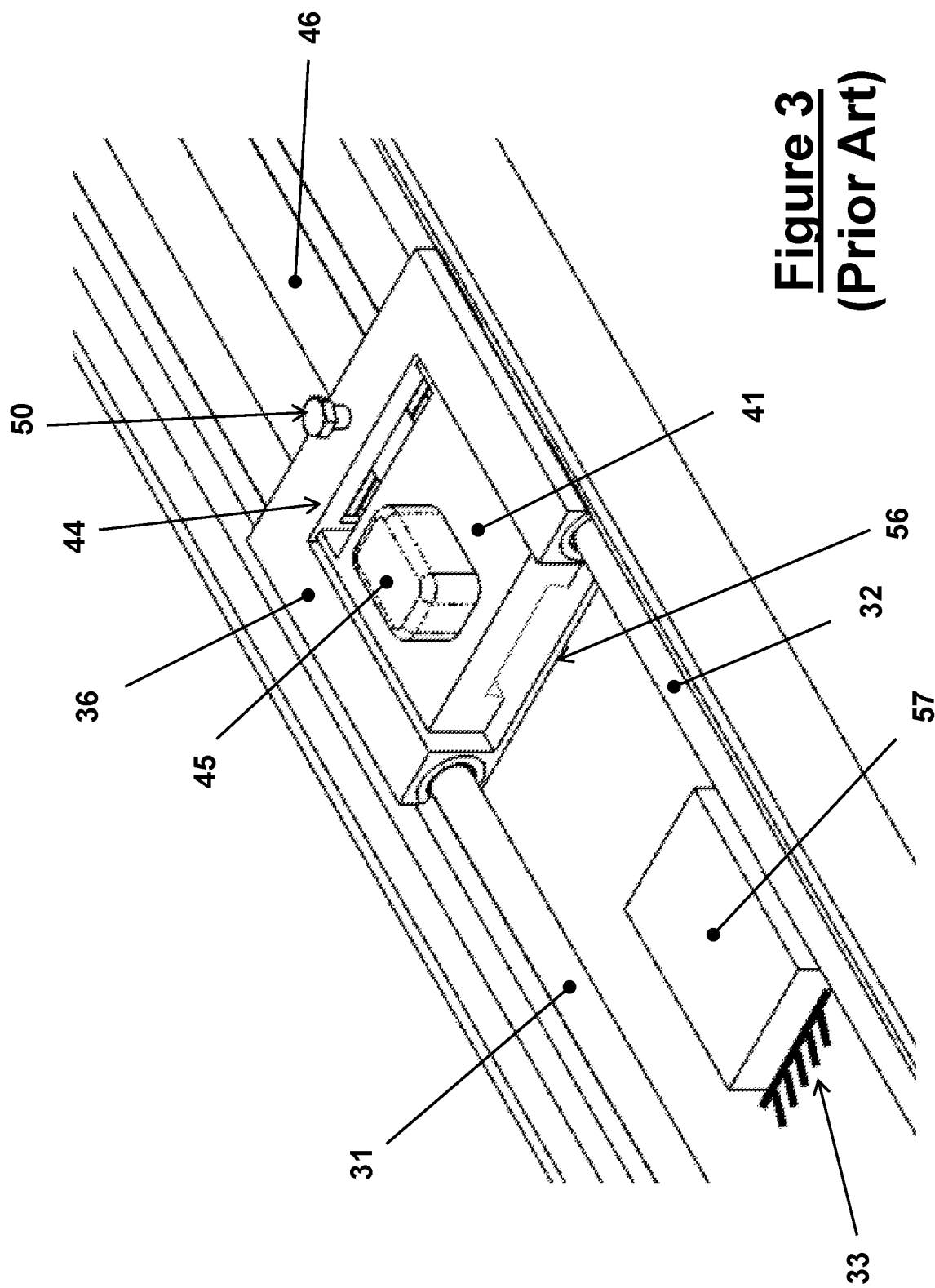
FIG. 3 illustrates a close-up view of the test carriage and platform of the prior art mechanical shock testing embodiment of FIG. 2.
Figure 4:
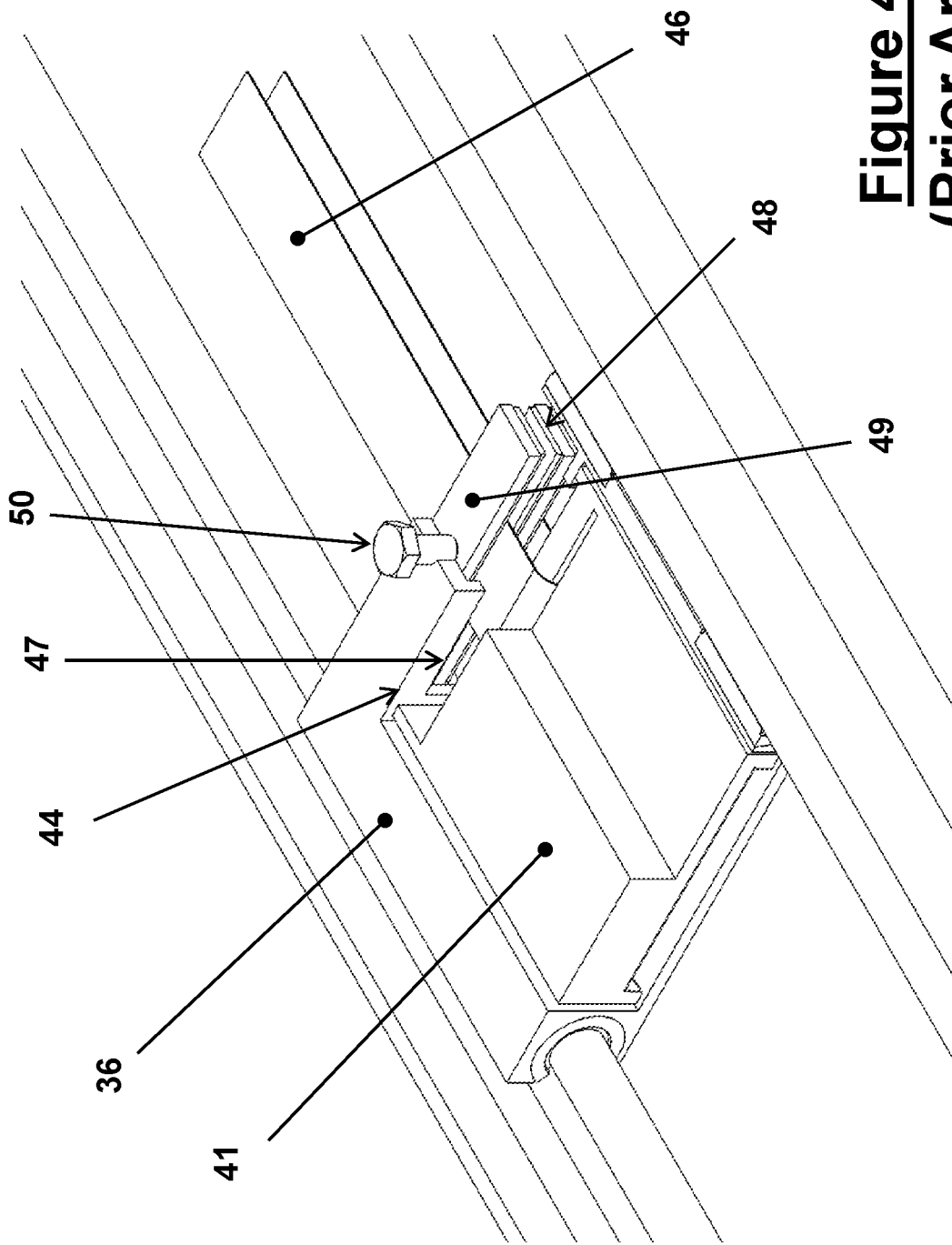
FIG. 4 illustrates the isometric view of the mechanical shock testing machine embodiment of FIG. 2 with a cutaway view of the braking mechanism section of the machine.
Figure 5:
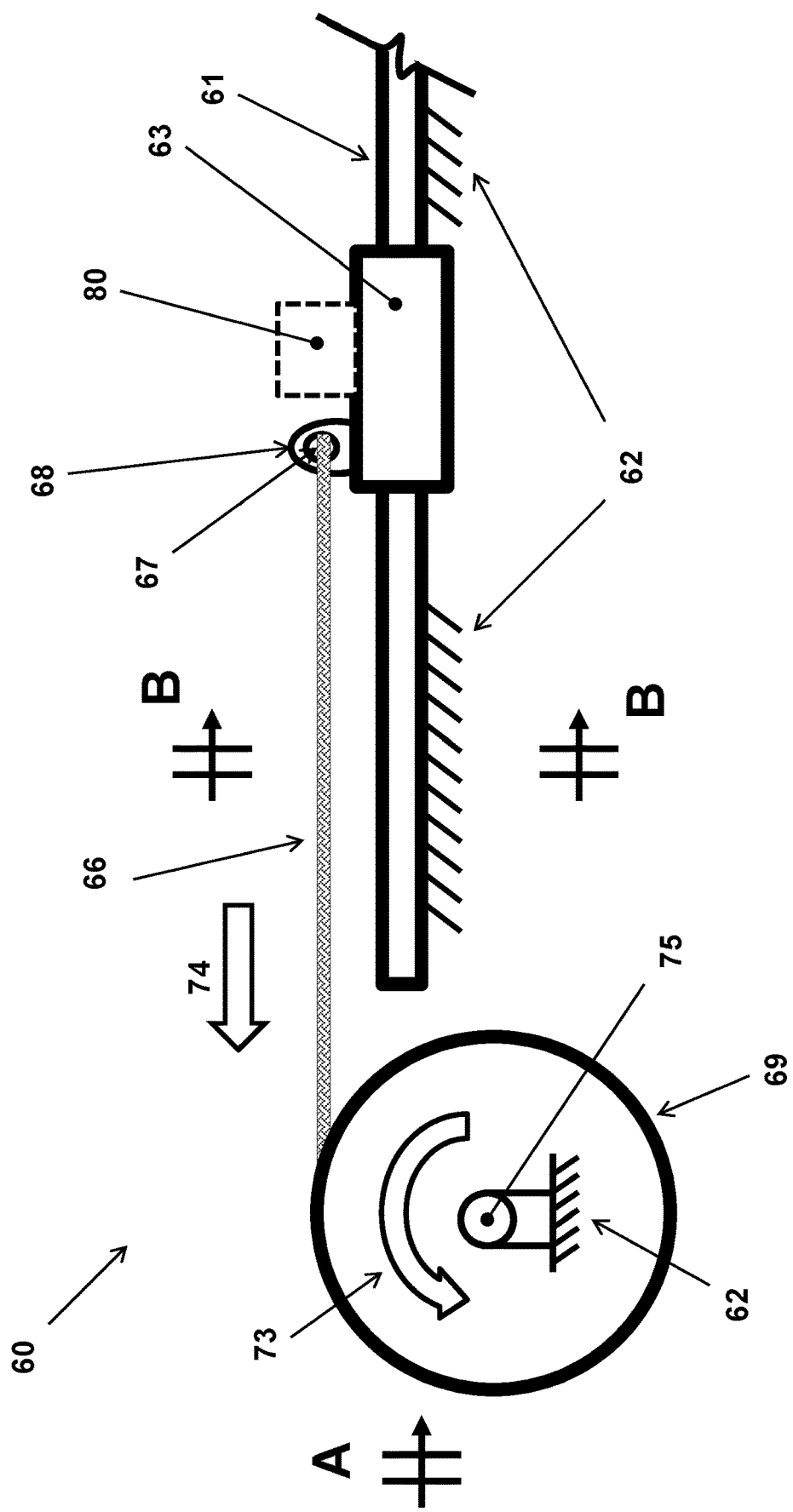
FIG. 5 illustrates the side view of the first embodiment of the mechanical acceleration profile event simulating shock testing machine.
Figure 6A:
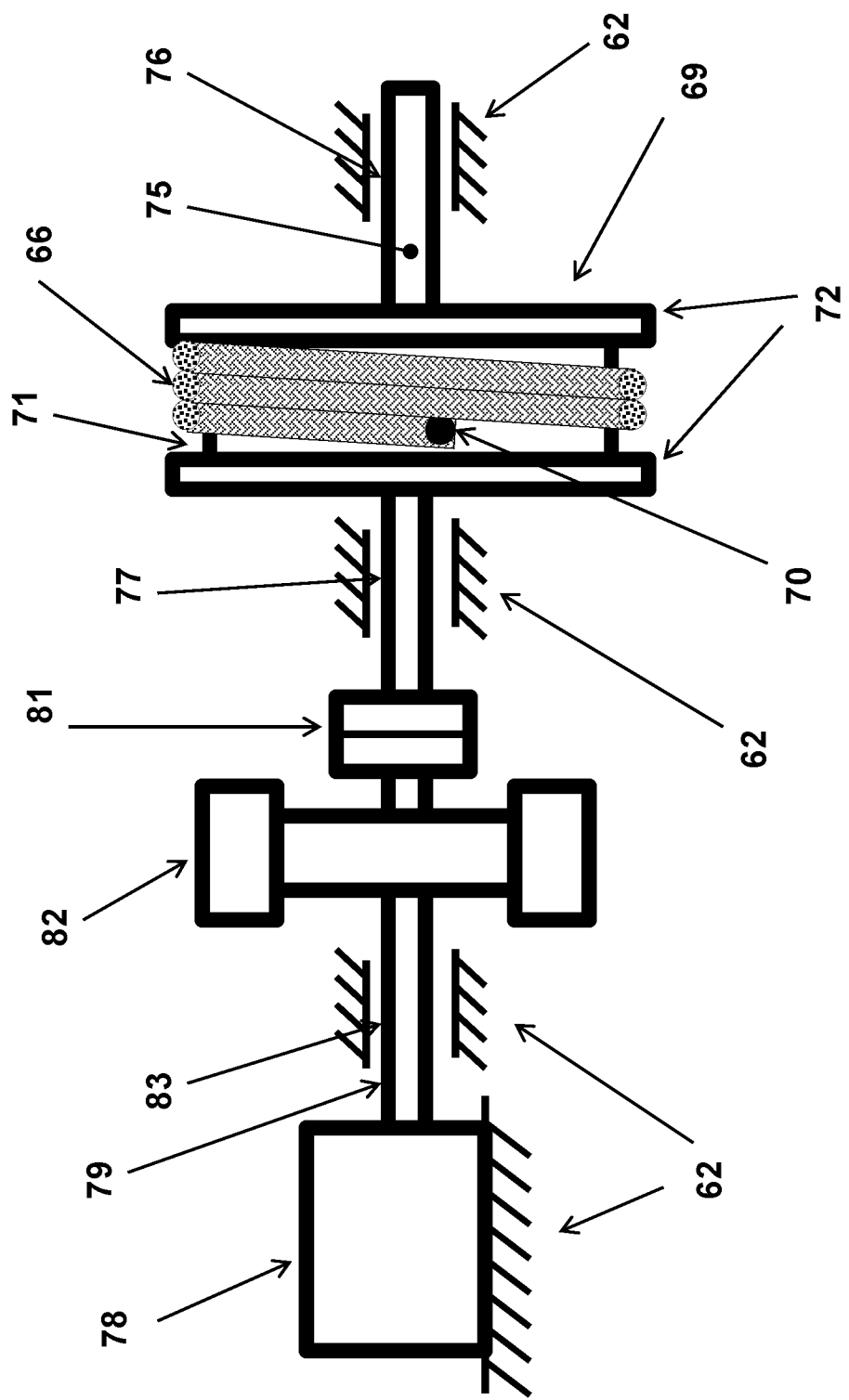
FIG. 6A illustrates the frontal view "A" view of the mechanical acceleration profile event simulating shock testing machine embodiment of FIG. 5.

The schematic side and frontal views "A" of the mechanical acceleration profile event simulating shock testing machine embodiment 60 are shown in FIGS. 5 and 6A, respectively. The cross-sectional view B-B of FIG. 5 is shown in FIG. 7.

The mechanical acceleration profile event simulating shock testing machine 60 is in general horizontally installed so that it could accommodate relatively long rails. The rails 61, FIGS. 5 and 7, are attached to the machine base structure 62 (shown schematically as ground in FIG. 5) by rigid support structures 64 as shown in FIG. 7. A carriage member 63, FIG. 5, is provided with sleeve bearings 65 as shown in the cross-sectional view B-B of FIG. 7 to travel along the rails 31 freely with minimal friction.

Figure 7:
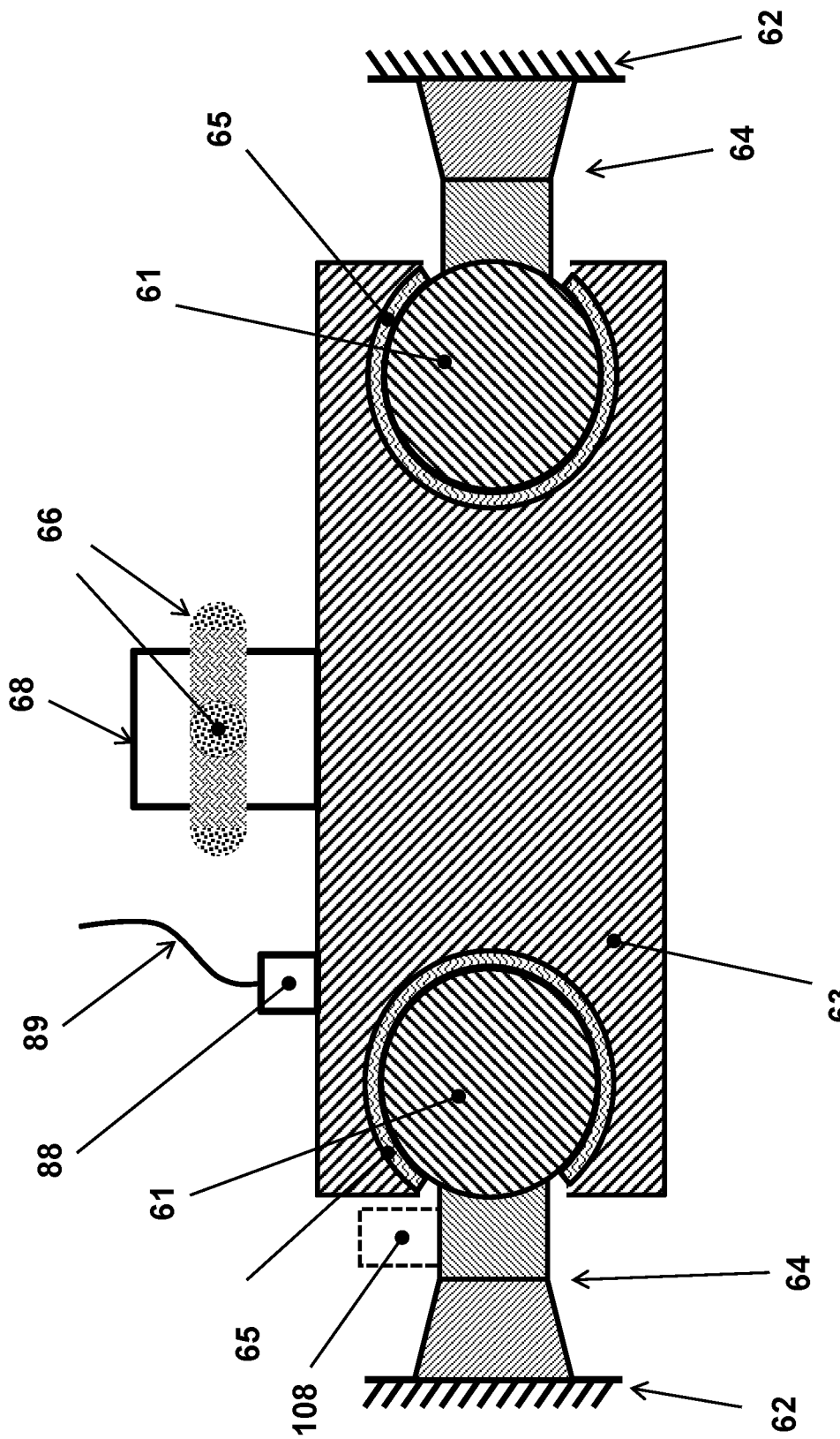
FIG. 7 illustrates the cross-sectional view B-B of FIG. 5 of the first embodiment of the mechanical acceleration profile event simulating shock testing machine.

In the schematic of FIG. 7 the cable 66 is shown to be attached to the support member 68 of the carriage 63 a certain distance above the centerline of the rails 61, which is done solely for the sake of clarity. In practice, however, the cable 66 is preferably attached to the carriage at a point that lies on the centerline of the rails 61 and is positioned symmetrically between the two rails. The center of mass of the carriage 63, which can be with the assembled components to be tested 80 (FIG. 5) is also located at the point of the cable 66 attachment as seen in the view of FIG. 7.

The carriage 63 is configured to be accelerated with a prescribed time profile by the pulling of the cable 66. The cable 66 is attached to the carriage 63 on one end, for example by passing it through the hole 67 in the support member 68 as shown in the schematic of FIG. 5 or alternatively by a quick release mechanism, particularly for higher acceleration and/or duration tests, as to be described later in this disclosure. The other end of the cable 66 is fixedly attached to the "barrel" 71 of the wheel 69 by a fastener 70 or the like, FIGS. 5 and 6A, for the rotation of the barrel in the direction of the arrow 73 would wrap the cord 66 over the "barrel" 71 of the wheel 69, thereby pulling the carriage member 63 towards the wheel 69, i.e., in the direction of the arrow 74.

The wheel 69 is mounted on and fixedly held to the shaft 75, FIGS. 5 and 6A. The shaft 75 is supported by the bearings 76 and 77, FIG. 6A. The wheel 69 is driven by the electric motor 78 via the shaft 79. The motor 78 may be a gearmotor or may drive a gearbox (not shown) with the output shaft 79, as may be required depending on the magnitude and duration of the acceleration profile to be provided by the mechanical acceleration profile event simulating shock testing machine 60 and the total mass of the carriage 63 and the components 80 (FIG. 5) to be tested. The output shaft 79 of the motor is then connected to the shaft 75 of the wheel by the clutch member 81.

The electric motor 79 may be a low rotor inertia and high torque servomotor or any other appropriate type of electric motor depending on the range of acceleration profiles that the mechanical acceleration profile event simulating shock testing machine 60 must provide and the mass of the components or systems to be tested. The required rotation of the electric motor 79 can be computer controlled using an appropriate control system (not shown). Such motion control controllers for different electric motors and their power electrical and electronics are well known in the art.

The output shaft 79 of the motor 78 may be attached to the clutch 81 through a provided flywheel 82. In some applications, it is necessary for the mechanical acceleration profile event simulating shock testing machine 60 be provided with the flywheel 82 so that it could provide the desired acceleration rapidly, for example achieve 40-50 G acceleration of the total mass of the carriage 63 and the testing components 80 from rest within 25-50 milliseconds. It is appreciated that as it is described later in this disclosure, in such applications the clutch 81 must be capable of being engaged by the system operator as the flywheel is first brought to the require spin rate. In general, particularly when the flywheel 82 is provided, the shaft 79 is supported by a bearing 83 as shown in FIG. 6A.

The mechanical acceleration profile event simulating shock testing machine 60 would apply a desired acceleration profile to a component to be tested as follows. The components 80 that are to be tested are fixedly attached to the carriage member 63, FIG. 5. The cable 66 is then attached to the support member 68 using one of the methods to be described, for example by a quick release mechanism. The controller of the electrical motor 78 is programmed to rotationally accelerate the wheel 69 in the direction of the arrow 73 to achieve the desired acceleration profile of the carriage member 63 in the direction of the arrow 74 by the wrapping of the cable 66 over the barrel 71 section of the wheel, FIG. 6A. The relationship between the rotational acceleration of the wheel in the direction of the arrow 73 and the linear acceleration of the cable 66 and thereby the carriage 63 (neglecting the elasticity of the cable 66 and other components of the system) are readily determined as follows.

If the radius of the barrel 71 of the wheel 69 where the cable 66 is wound over is R (m), then the acceleration a (m/s$^2$) of the cable 66 in the direction of the arrow 74 and thereby the acceleration of the carriage 63 becomes $$a = r\alpha \quad (1)$$

where α (rad/s) is the rotary acceleration of the wheel 69. It is appreciated that for a prescribed acceleration profile for the carriage 63, the linear acceleration and the rotational acceleration are both functions of time in equation (1) and generally start from zero accelerations (carriage 63 rest position) to a certain end acceleration level at the end of the prescribed acceleration testing profile.

Figure 6B:
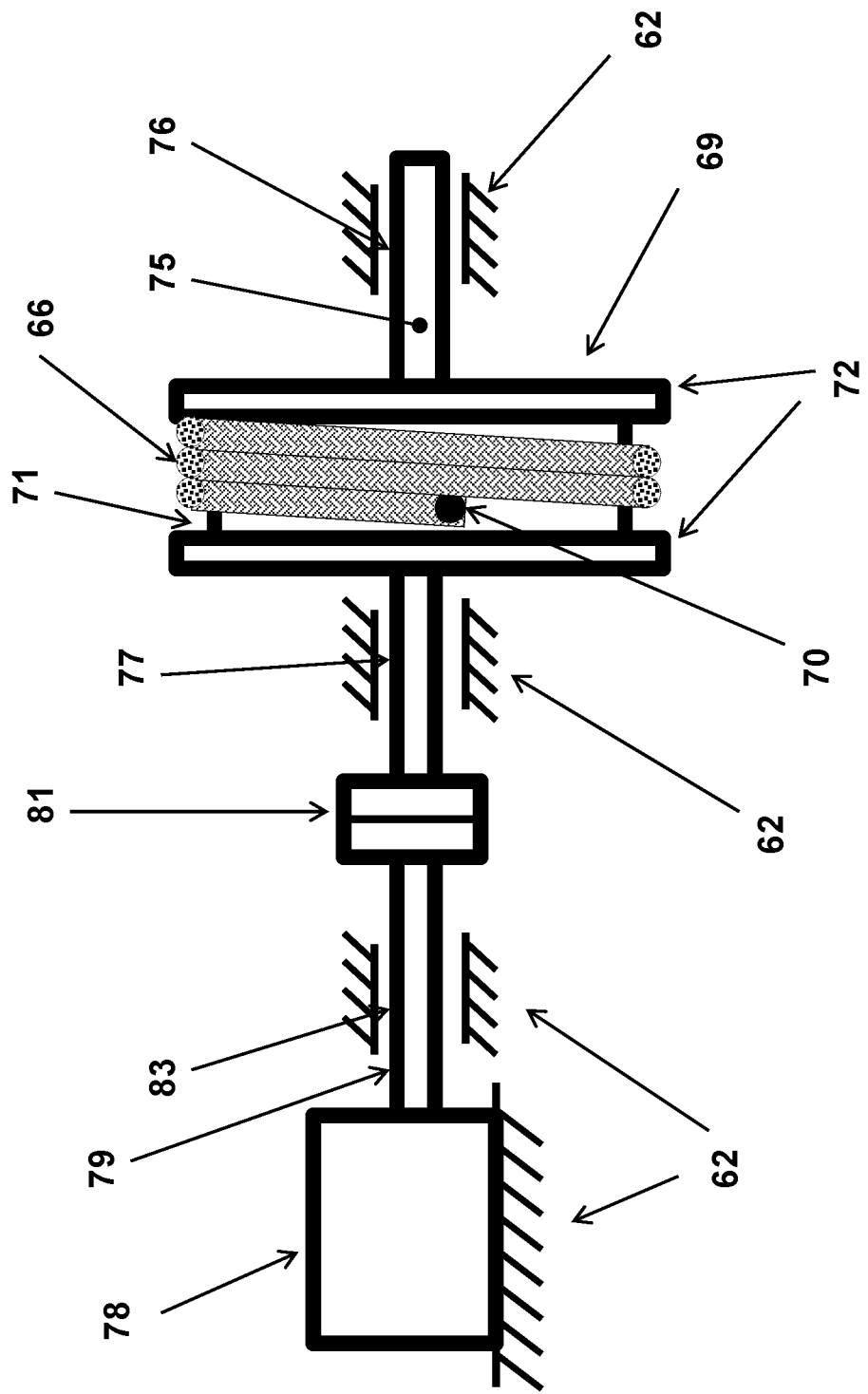
FIG. 6B illustrates the frontal view "A" view of a modified mechanical acceleration profile event simulating shock testing machine embodiment of FIG. 5 used for testing components with lower acceleration profile levels.
Figure 6C:
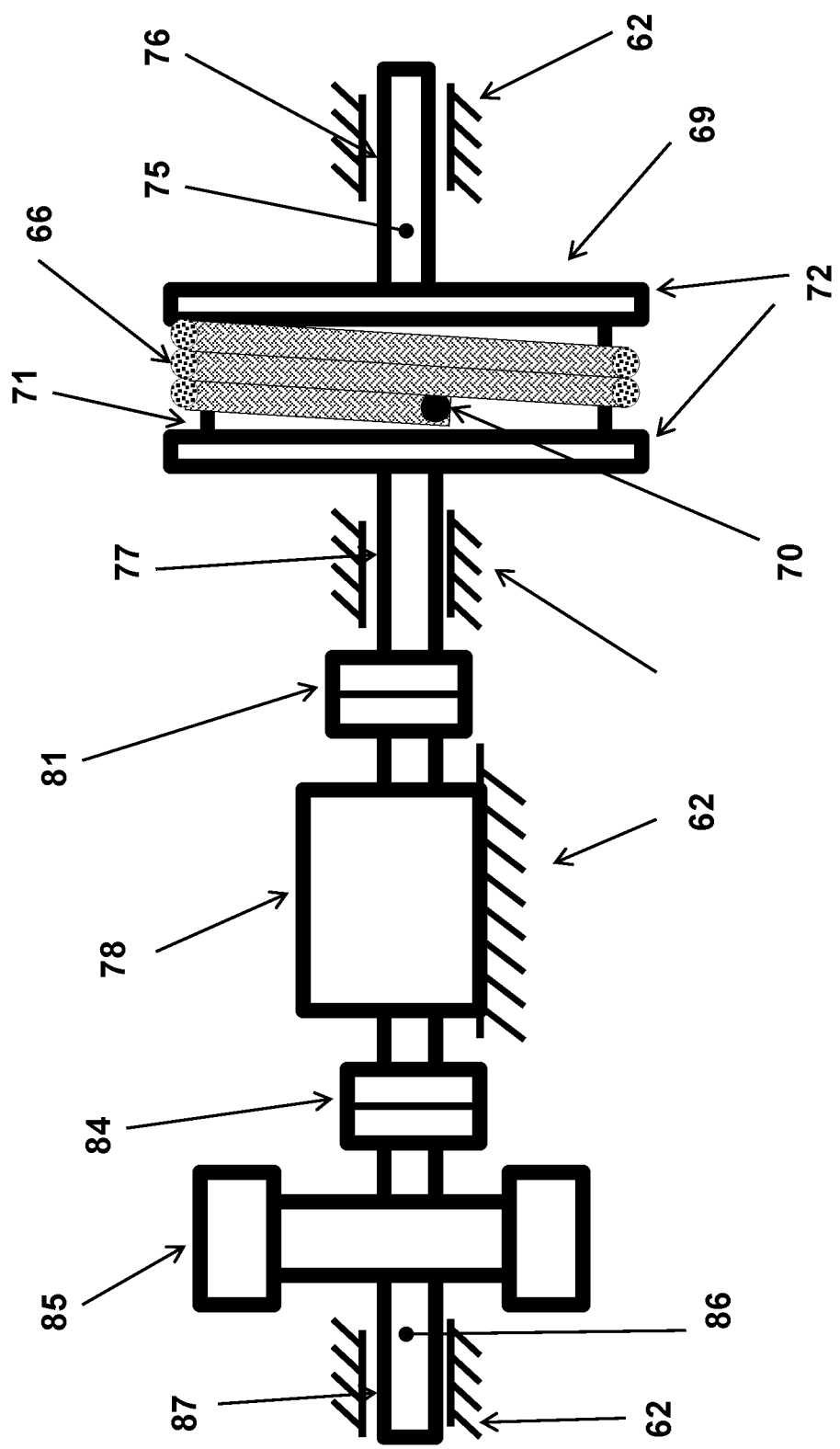
FIG. 6C illustrates the frontal view "A" view of a modified mechanical acceleration profile event simulating shock testing machine embodiment of FIG. 5 used for testing components with high and low acceleration profile levels.

Two modified versions of the mechanical acceleration profile event simulating shock testing machine 60 are shown in FIGS. 6B and 6C. In the modified embodiment of FIG. 6B, the mechanical acceleration profile event simulating shock testing machine is identical to that of the embodiment of FIG. 6A except that its flywheel 82 is removed. The modified embodiment of FIG. 6C of the mechanical acceleration profile event simulating shock testing machine is also identical to that of the embodiment of FIG. 6A, except that it is provided with an additional clutch 84 on the opposite side of the electric motor 78 as compare to the embodiment of FIG. 6A, and the flywheel 85 is also moved to the opposite side of the motor 78 as shown in FIG. 6C. The clutch 84 and flywheel side shaft 86 can be provided with the bearing 87 for support.

The operation of the wheel 69 for applying the prescribed acceleration profile to the carriage 63 of the mechanical acceleration profile event simulating shock testing machine 60, FIGS. 5 and 6B, is generally controlled as follows. The clutch 81 is disengaged. The components 80 to be tested are fixedly attached to the carriage 63 and the cable 66 is attached to the carriage, FIG. 5. The wheel 69 is turned (usually manually) until the cable 66 is taut. The electric motor 78 controller computer is programmed to begin to rotate the wheel with the rotary acceleration a, corresponding to the prescribed linear acceleration a to be applied to the testing components as given by equation (1). The clutch 81 is then engaged and the electric motor 78 controller is commanded to apply the programmed prescribed acceleration profile to the carriage 63 by the rotation of the wheel 69 as was programmed for the prescribed acceleration profile period. The electric motor 78 may be programmed to rapidly come to a stop and/or the clutch 81 may be disconnected at the completion of the testing acceleration profile, particularly when the clutch engagement/disengagement mechanism is controlled by the same system controller computer.

Another method of applying the prescribed acceleration profile to the carriage 63 and thereby the components 80 to be tested, FIGS. 5 and 6B, an accelerometer 88 is provided on the carriage 63 as shown in FIG. 7, which measures acceleration in the direction of the carriage travel as show by the arrow 74 in FIG. 5. The output 89 of the accelerometer 88 is then used as the sensory input into the electric motor 78 controller for a more precise carriage 63 tracking of the prescribed testing acceleration profile. The schematic of the top view of such a mechanical acceleration profile event simulating shock testing machine embodiment is shown in FIG. 8.

Figure 8:
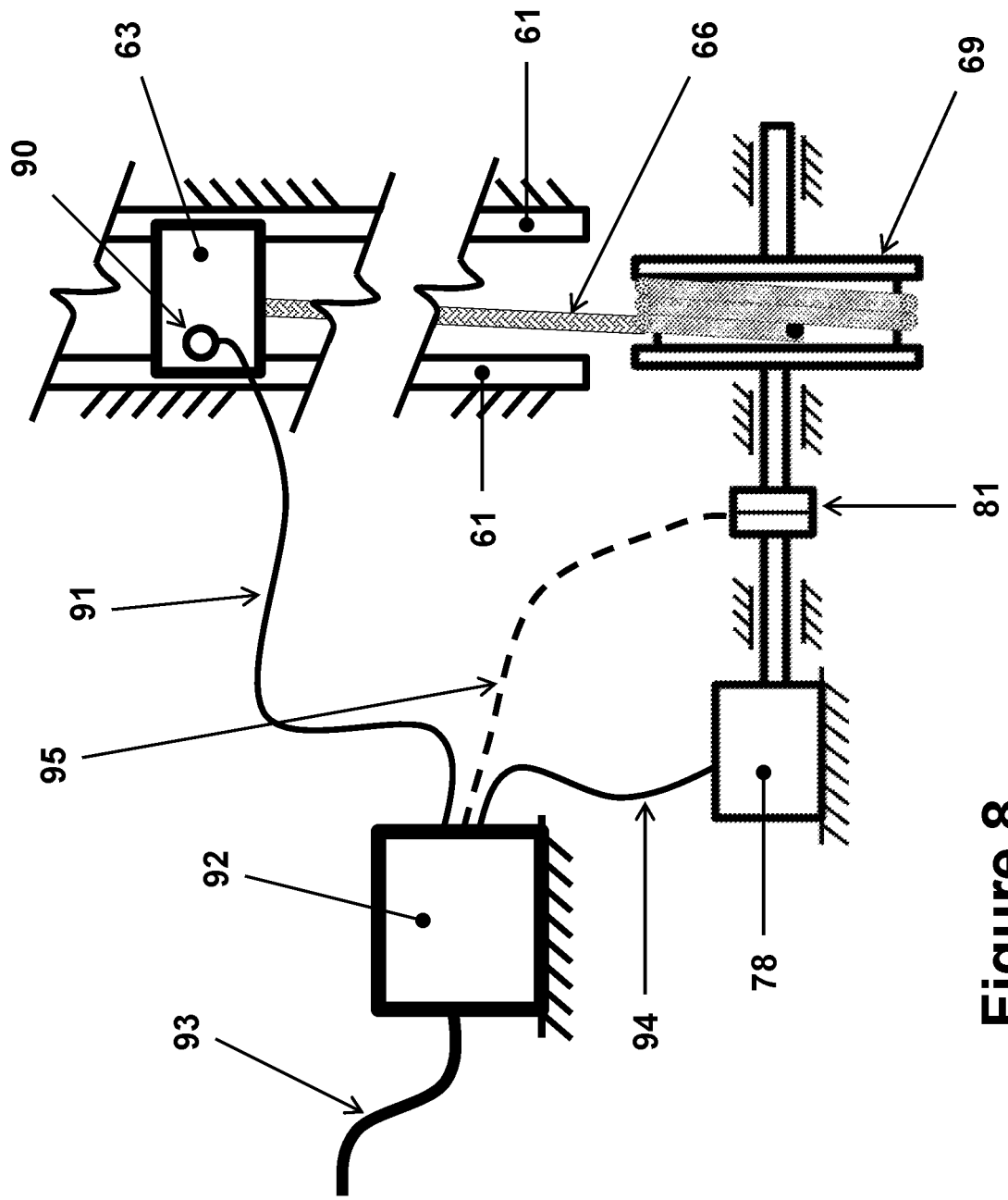
FIG. 8 illustrates the top view of a typical mechanical acceleration profile event simulating shock testing machine embodiment with the configuration of FIG. 6B.

In the top view of the mechanical acceleration profile event simulating shock testing machine embodiment of FIG. 8, the testing machine is shown in its FIG. 6B configuration. As can be seen in FIG. 8, an accelerometer 90 is attached to the carriage 63, which is directed to measure the acceleration of the carriage in the direction of its travel over the rails 61. The acceleration measurement signal is then transmitted to the system controller 92 via the line 91, which needs to be long enough to accommodate the length of travel of the carriage 63. The measured acceleration signal may also be transmitted via an RF signal by a transmitter that is fixed to the carriage and that is powered by a battery, particularly when the length of travel of the carriage is relatively long and makes the running of tests cumbersome. The system controller is computer (microprocessor) controlled and is usually powered from an external source via the line 93. The system controller is used to power and control the operation of the electric motor 78 via the line 94. When an electrically torque controlled clutch 81 (for example, as a commonly known eddy current or electromagnetic or pneumatic type or the like clutch) is used, for example in the mechanical acceleration profile event simulating shock testing machine embodiment of FIG. 6A described later in this disclosure, then its torque level is controlled by the system controller 92 via the line 95 shown in dashed lines in FIG. 8. Other required control functions of the machine can also be performed by a central controller unit 92.

The mechanical acceleration profile event simulating shock testing machine embodiment of FIG. 6B is particularly suitable for testing with acceleration profiles with relatively low magnitude, for example of the order of 15-30 G, and durations that may be as high as 100 or more milliseconds. In such applications, a high torque electric motor with relatively low rotor inertia can readily achieve the prescribed acceleration profile. It is also appreciated that the wheel 69 and the carriage 63 must be configured to have minimal inertia, i.e., mass for the case of the carriage and moment of inertial for the case of the wheel, clutch, and the connecting shafts.

The operation of the wheel 69 for applying the prescribed acceleration profile to the carriage 63 of the mechanical acceleration profile event simulating shock testing machine 60, FIGS. 5 and 6A, is generally controlled as follows. The clutch 81 is disengaged. The components 80 to be tested are fixedly attached to the carriage 63 and the cable 66 is attached to the carriage, FIG. 5. The wheel 69 is turned (usually manually) until the cable 66 is taut. In this embodiment, the clutch 81 is torque controlled electrically (for example, as a commonly known eddy current or electromagnetic or pneumatic type or the like clutch). The electric motor 78 is then powered until the flywheel has reached the desired speed. The system controller computer is programmed to begin to apply the required torque by the clutch to the wheel 69 to achieve the rotary acceleration a, corresponding to the prescribed linear acceleration a to be applied to the testing components as given by equation (1). The clutch 81 is then engaged to apply the prescribed acceleration to the carriage 63. To achieve higher acceleration profile accuracy as well as to minimize the need for fine adjustments of the level of applied torque by the clutch 81, the acceleration measured by the accelerometer 88, FIG. 7, is used as the sensory input to the clutch torque controller to minimize the error between the prescribed carriage sensor and its measured acceleration as was previously described for the testing system of FIG. 8.

The mechanical acceleration profile event simulating shock testing machine embodiment of FIG. 6A is also particularly suitable for testing with acceleration profiles with relatively low magnitude, for example of the order of 15-30 G, and durations that may be as high as 100 or more milliseconds.

The modified embodiment of FIG. 6C of the mechanical acceleration profile event simulating shock testing machine is configured to operate as either the embodiment of FIG. 6A or the embodiment of FIG. 6B with some differences as described below.

The operation of the wheel 69 for applying the prescribed acceleration profile to the carriage 63 of the mechanical acceleration profile event simulating shock testing machine

60 FIG. 5 with the modified embodiment of FIG. 6C is like those of the embodiments of FIGS. 6A and 6B. The clutches 84 and 81 are disengaged. The components 80 to be tested are fixedly attached to the carriage 63 and the cable 66 is attached to the carriage, FIG. 5. The wheel 69 is turned (usually manually) until the cable 66 is taut.

Then if desired to operate the testing machine as the embodiment of FIG. 6B, the clutch 84 is left in its disengaged state. The electric motor 78 controller computer is programmed to begin to rotate the wheel with the rotary acceleration a, corresponding to the prescribed linear acceleration a to be applied to the testing components as given by equation (1). The clutch 81 is engaged. The electric motor 78 controller is then commanded to apply the programmed prescribed acceleration profile to the carriage 63 by the rotation of the wheel 69 as was programmed for the prescribed acceleration profile period. The electric motor 78 may be programmed to rapidly come to a stop and/or the clutch 81 may be disconnected at the completion of the testing acceleration profile, particularly when the clutch engagement and disengagement mechanism is controlled by the same system controller computer.

If it is desired to operate the testing machine embodiment of FIG. 6C as the embodiment of FIG. 6A, the clutch 84 is left engaged. In this embodiment, the clutch 81 is torque controlled electrically (as a commonly known eddy current or electromagnetic or pneumatic type clutch or the like). The electric motor 78 is then powered until the flywheel has reached the desired speed. The system controller computer is programmed to begin to apply the required torque by the clutch to the wheel 69 to achieve the rotary acceleration a, corresponding to the prescribed linear acceleration a to be applied to the testing components as given by equation (1). The clutch 81 is then engaged to apply the prescribed acceleration to the carriage 63. To achieve higher acceleration profile accuracy as well as to minimize the need for fine adjustments of the level of applied torque by the clutch 81, the acceleration measured by the accelerometer 88, FIG. 7, is used as the sensory input to the clutch torque controller to minimize the error between the prescribed carriage sensor and its measured acceleration as was previously described for the testing system of FIG. 8.

It is appreciated by those skilled in the art that in the embodiments of FIGS. 6A and 6C (when using the clutch 81 for torque transmission control), the clutch 81 may be a disc clutch type in which the disc pressure is adjusted to achieve the desired level of torque that is transmitted to the wheel 69 instead of using the aforementioned eddy current or electromagnetic or pneumatic type clutch or the like. The use of friction disc type clutches is particularly suitable when the prescribed acceleration profile has relatively high magnitude since friction disc type clutches can transmit significantly higher torque levels than eddy current type clutches of the same size. For relatively low acceleration level acceleration profiles, the eddy current type clutches are preferred since they exhibit very high dynamic response and torque level precision. As a result, very short acceleration rise-time and accelerometer feedback response and therefore acceleration profile accuracy can be achieved.

In a mechanical acceleration profile event simulating shock testing machine using a friction disc type clutch, for example clutch 81 in the embodiment of FIG. 6A, to control the level of torque that is transmitted to the wheel 69, the torque adjustment may be done either manually or by a control signal generated by the system controller 92, FIG. 8. In the former method, the user adjusts the pressure level of the friction disc clutch before the test using the pressure adjustment mechanism provided by the manufacturer as is the common practice. The manual adjustment option is suitable for applications in which the prescribed acceleration profile to be achieved is essentially of constant magnitude. This is usually the case for a wide range of munitions testing. However, if the prescribed acceleration profile has varying level over its period, then the pressure of the friction disc(s) has to be controlled by an external actuation mechanism, such one powered by a hydraulic, pneumatic or electrical actuator. Such actuation mechanism are known in the art, but are usually not capable of varying the friction disc pressure fast enough for most munitions testing applications.

It is appreciated that by the application of the prescribed acceleration profile to the assembly of carriage 63 and its testing components, the assembly would have gained a significant velocity and must be brought to rest. For example, if prescribed acceleration profile requires 100 G of the carriage 63 from rest for 10 milliseconds, then the terminal velocity V of the carriage will be:

$$V = at = (100)(9.8)(10 \times 10^{-3}) = 9.8 \text{ m/s}$$

where the gravitational acceleration is the indicated 9.8 m/s². The carriage 63 and its testing components is, however, usually required to be brought to rest at significantly lower deceleration levels as those of the prescribed applied acceleration profile. Several methods of decelerating the carriage 63 assembly are described below together with their preference for each mechanical acceleration profile event simulating shock testing machine configuration and application.

In certain applications, the purpose of the acceleration test is to determine if the component being tested would perform its configured task during the acceleration period and that the level of deceleration applied to bring the carriage 63 to a stop is not of a concern. This would, for example, would be the case when testing an initiation device that is configured to initiate a percussion primer as the result of the prescribed acceleration profile. In such a case, the initiation of the percussion primer during the acceleration test is clearly detected from its sound and particularly if a high-speed video recording of the test is also made, which would record the time of the initiation and the flame and sparks that are generated by the ignited percussion primer. In such cases, the carriage 63 may even be decelerated at significantly higher rates than the prescribed acceleration profile levels, usually be providing a proper shock absorber or the like. However, if the purpose of the test is to observe how the initiation mechanisms and its various components react to the applied prescribed acceleration profile or fail during the engineering development process of the initiation device, then the carriage 63 must usually be brought to a stop at significantly lower deceleration levels.

It is appreciated that the total length of travel by the carriage of a mechanical acceleration profile event simulating shock testing machine, such as the embodiment 60 of FIG. 5, from rest to the completion of the prescribed acceleration profile period is readily determined by integration of the acceleration profile over its period. For example, for the aforementioned prescribed acceleration of a=100 G over a period of t=10 milliseconds, the total distance D traveled during the said acceleration period is given as $$D = (0.5)at^2 = (0.5)(100)(9.8)(0.010)^2 = 0.049 \text{ m} \quad (2)$$

where the gravitational acceleration is the indicated 9.8 m/s². Then at this time, the carriage 63 has gained a speed V of $$V = at = (100)(9.8)(0.010) = 9.8 \text{ m/s} \quad (3)$$

It is also appreciated that the assembly of carriage 63 and its testing components start their motion from rest and their acceleration is usually brought to its peak, for example the above 100 G level, over a certain amount of time. As a result, the total distance travelled by the carriage 63 is slightly longer. Now assuming that the carriage 63 is decelerated to a stop from its above peak velocity of $V_0=9.8$ m/s a rate of $a=-5$ G, then the total distance $D_s$ needed to decelerate the carriage to a stop can be determined by first determining the amount of time $t_d$ that the deceleration must be applies to bring the carriage from the velocity $V_0=9.8$ m/s to a stop, i.e., to a velocity $V=0$, from $$V = at_d + V_0 = (-5)(9.8)V_0 + 9.8 = 0$$

Which yields a duration of $t_d=0.2$ s. The total distance $D_s$ that is required to bring the carriage to a stop is then calculated from $$D_s = (0.5)at_d^2 + V_0 t_d \qquad (4)$$

That is $$D_s = (0.5)(-5)(9.8)(0.2)^2 + (9.8)(0.2) = 0.98 \text{ m}$$

It is therefore appreciated that the total distance that the carriage 63 would travel during each acceleration test is determined primarily by how slowly the carriage has to be decelerated following the prescribed testing acceleration as was previously described.

It is appreciated that in a mechanical acceleration profile event simulating shock testing machine of the embodiment 60 type (FIGS. 5 and 6A), the accelerating cable 66 cannot be used to decelerate the carriage 63 following the application of the prescribed acceleration profile since the cable can only apply a pulling force to the carriage. In addition, it is highly desirable for the cable 66 to be disconnected from the carriage 63 at the end of the applied acceleration profile period. Hereinafter, the methods and apparatus for bringing the carriage 63 together with the testing components that are attached to it to a stop are described for the period after the cable 66 has been already disconnected from the carriage 63. Methods and apparatus for disconnecting the cable 66 from the carriage 63 are described later in this disclosure.

It is appreciated that in all the above embodiments, once the carriage 63 with test components 80, FIG. 5, has been subjected to the prescribed acceleration profile and as a result has gained a relatively high velocity, for example a velocity of 9.8 m/s for a prescribed acceleration of 100 G for 10 milliseconds, then it must be brought to a stop. In addition, since the electric motor 78 and its driving inertia, even without the flywheel 82 of the embodiment of FIG. 6A, does not allow its very rapid strop without the use a powerful braking mechanism, the cable 66 must be rapidly disengaged from the carriage 63 at the completion of the application of the prescribed acceleration profile.

Several methods and quick release mechanisms may be used to disengage the cable 66 from the carriage 63. In one method, the cable 66 is cut by a shearing mechanism provided on the carriage as shown in the top view (looking at the component being tested 80, FIG. 5) of the carriage and the cable components of FIG. 9. The frontal view "C" of the cable shearing mechanism of FIG. 9 is shown in FIG. 10.

Figure 9:
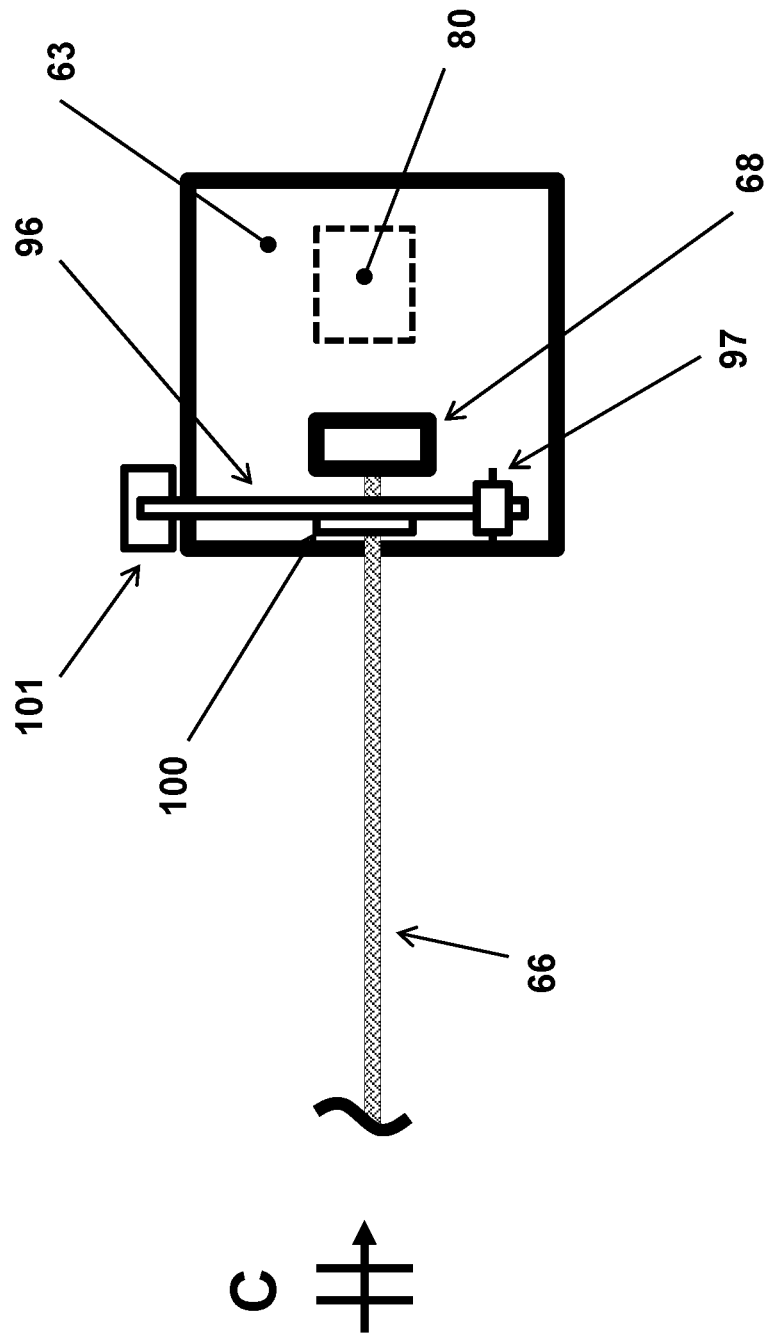
FIG. 9 illustrates the top view of the cable and carriage components of the embodiments of FIGS. 5 and 6A-6C with a cable shearing mechanism for cutting the cable at the completion of the carriage acceleration test.
Figure 10:
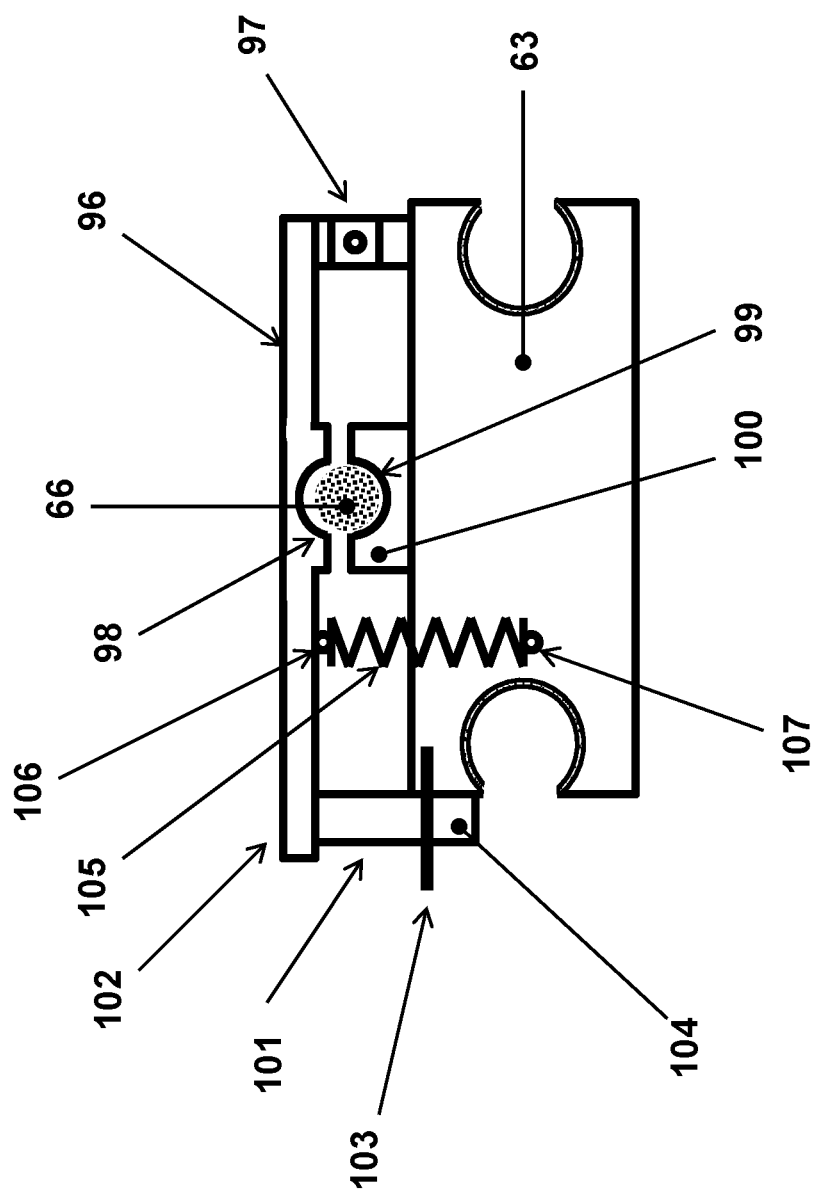
FIG. 10 illustrates the frontal view "C" of the cable shearing mechanism of FIG. 9.

As can be seen in the top view of FIG. 9 and the frontal view of FIG. 10 of the carriage 63, the above shearing mechanism consists of a link 96, which is attached to the carriage 63 by the rotary joint 97. As can be seen in the frontal view "C" of FIG. 10, one side of shearing cutter blade 98 is attached to the link 96 and the opposing shearing cutter blade 99 is attached to a support member 100, which is in turn fixedly attached to the carriage 63. The shearing cutter blades 98 and 99 may be curved as shown in FIG. 10 for the passage of the cable 66 and to minimize their size. In FIG. 10 the shearing cutter blades 98 and 99 are shown to be integral to the link 96 and support 100, respectively. However, in practice the shearing cutters are usually made of an appropriate cutting tool material and are fixedly attached to the link 96 and support 100.

As can be seen in the configuration shown in FIG. 10, the tip 102 of the link 96 is supported by the link 101, which is attached to the carriage 63 by the rotary joint 103. As a result, the shearing cutter blades 98 and 99 are kept apart and away from the cable 66. A tensile spring 105 is also provided, which is attached to the link 96 on one end and to the carriage 63 on the other end with the pins 106 and 107, respectively. In the configuration of FIG. 10, i.e., while the carriage is being accelerated in the direction of the arrow 74 (FIG. 5) with the prescribed acceleration profile, the preloaded tensile spring 105 applies a force to the link 96, keeping the tip 102 of the link 96 in contact with the support link 101, thereby keeping the shearing cutting blades 98 and 99 away from the cable 66. Then a properly positioned member 108, which is attached to the rail support member 64 (shown in dashed lines in FIG. 7), would engage the end 104 (FIG. 10) of the link 101 and rotate it about the pin joint 103, thereby allowing the preloaded tensile spring 105 to force the link 96 down as viewed in FIG. 10. The cutting blades 98 and 99 would then engage the cable 66 and shear it, thereby disconnecting the carriage 63 from the pulling cable 66.

Another method of disconnecting the cable 66 from the carriage 63 once the carriage has been accelerated with the prescribed profile is to provide a quick release mechanism that is actuated at the completion of the acceleration profile period. The schematic of one implementation of such a quick release mechanism is shown in the top view (looking at the component being tested 80, FIG. 5) of the carriage 63 FIG. 11.

Figure 11:
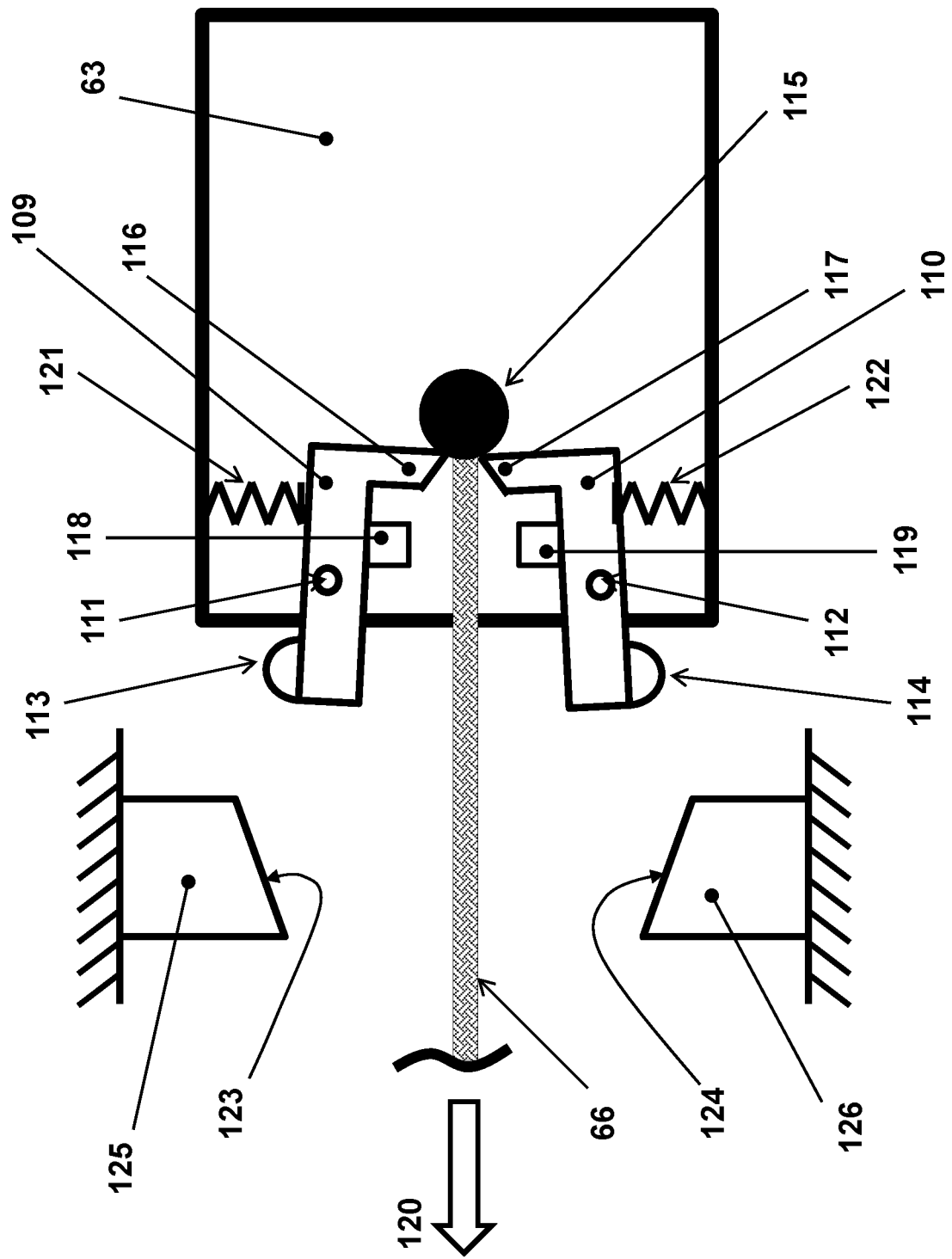
FIG. 11 illustrates a view of the cable and carriage components of the embodiments of FIGS. 5 and 6A-6C with a cable release mechanism.

As can be seen in the top view of FIG. 11 of the carriage 63, the quick release mechanism consists of the pair of links 109 and 110, which are attached to the carriage 63 by rotary joints 111 and 112, respectively. A rigid ball 111 or the like shaped solid member is fixedly attached to the end of the cable 66. Before acceleration test to begin, the ball 111 is positioned as shown in FIG. 11 and the cable 66 is set to be taut so that a slight pulling force of the cable would cause the ball 115 to apply a force to the tips 116 and 117 of the links 109 and 110 and rotate the link 109 in the clockwise direction and the link 110 in the counterclockwise direction as viewed in the plane of FIG. 11. The gap between the tips 116 and 117 of the links 109 and 110, respectively, would then begin to close until the links are stopped against the stops 118 and 119, which are provided on the carriage 63. At this point the gap between the tips 116 and 117 is enough to accommodate the cable 66. At this time, the acceleration testing can be initiated and the cable 66 begins to be pulled in the direction of the arrow 120.

The links 109 and 110 are also provided with compressively preloaded springs 121 and 122, respectively to bias the links in the positions shown in FIG. 11 against the stops 118 and 119. The links 109 and 110 are also provided with rounded extensions 113 and 114, respectively. Then as the carriage 63 reaches the end of its prescribed testing acceleration profile, the rounded extensions 113 and 114 would engage the sloped surfaces 123 and 124, respectively, of the release members 125 and 126, which are attached to the support structures 64 of the rails 62, FIG. 7. As a result, the engaging sloped surfaces 123 and 124 would rotate the links 109 and 110 in the counterclockwise and clockwise directions, respectively, as the carriage travels forward in the direction of the arrow 120, thereby opening the gap between the tips 116 and 117 of the links 109 and 110 and releasing the ball 115 and thereby the carriage 63.

As it was previously indicated, in certain applications, the purpose of the acceleration test is to determine if the component being tested would perform its configured function during the acceleration period and that the level of deceleration applied to bring the carriage 63 to a stop is not of a concern. This would, for example, would be the case when testing an initiation device that is configured to initiate a percussion primer as the result of the prescribed acceleration profile. In such cases, the carriage 63 may be decelerated at significantly higher rates than the prescribed acceleration profile levels, for example by stopping the carriage against a proper shock absorber.

However, if the purpose of the test is to observe how the various components of a device reacts to the applied prescribed acceleration profile and perform or fail to perform their function and for other similar purposes during engineering development, functionality testing, performance evaluation, and the like without causing any damage to the device and its components, then the carriage 63 must usually be decelerated to a stop at a controlled and significantly lower rates. Several methods may be used to achieve this goal, examples of which are presented below.

In the first method, a braking mechanism is provided and used to decelerate the testing machine carriage 63 at the completion of the applied testing acceleration profile period. The braking mechanism may be provided on the carriage 63 or may be mounted along the rails 61, over which the carriage travels, FIGS. 5 and 12. In general, carriage mounting of the braking mechanism is not desirable since it adds to the mass of the carriage, particularly if the level of the acceleration profile is high and/or is duration is long.

Figure 12:
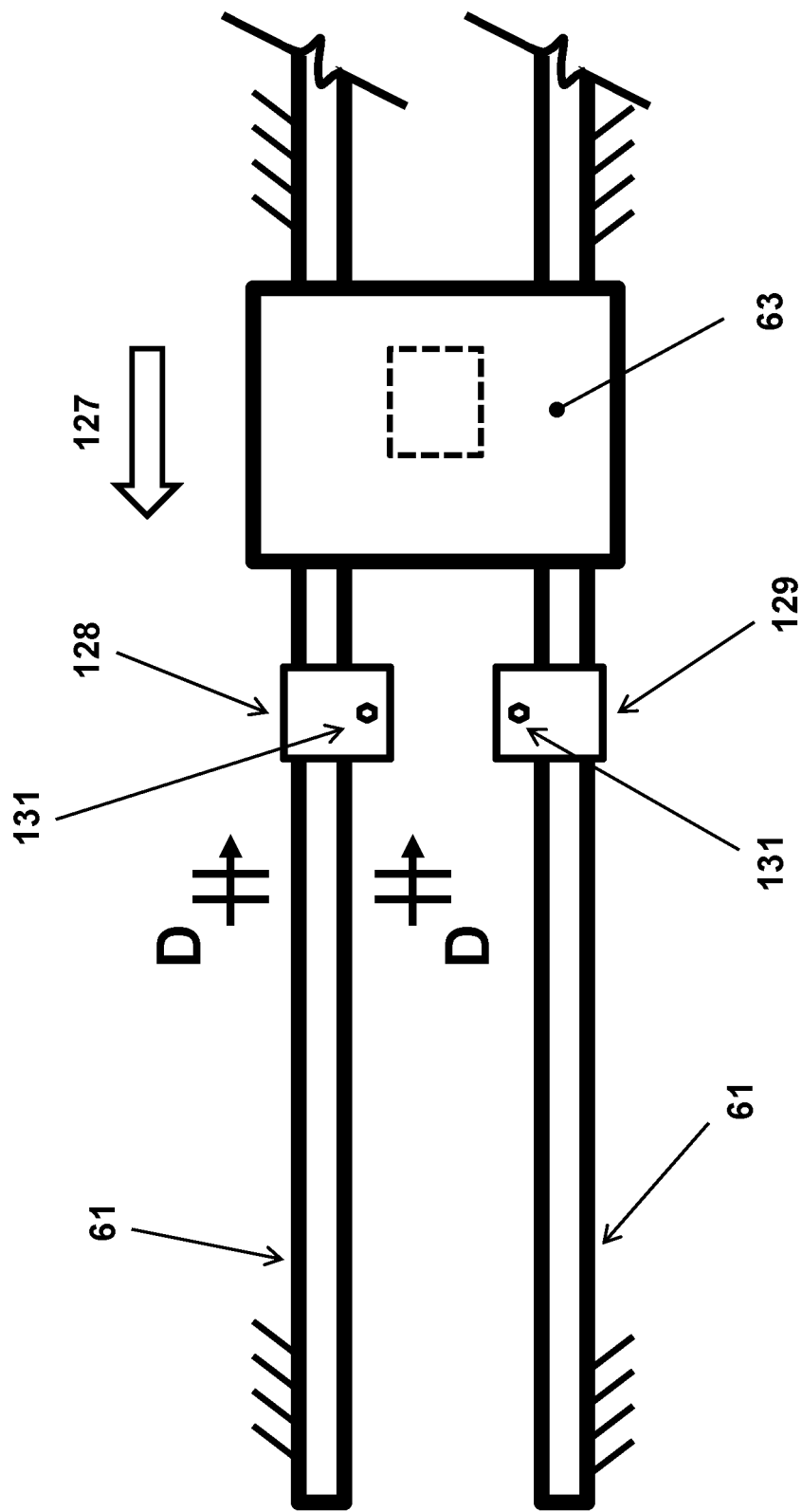
FIG. 12 illustrates a braking mechanism embodiment for stopping the carriage components of the embodiments of FIGS. 5 and 6A-6C at the completion an acceleration test.

FIG. 12 shows the top view of the carriage 63 as mounted on the rails 61 and moving in the direction of the arrow 127 with a certain velocity following the completion of the application of a prescribed acceleration profile. The carriage 63 would then engage the braking members 128 and 129, the details of their construction are shown in the cross-sectional view D-D of FIG. 13. The friction forces applied by the braking members to the carriage 63 would then decelerate the carriage as it travels in the direction of the arrow 127 and would eventually bring it to a stop.

Figure 13:
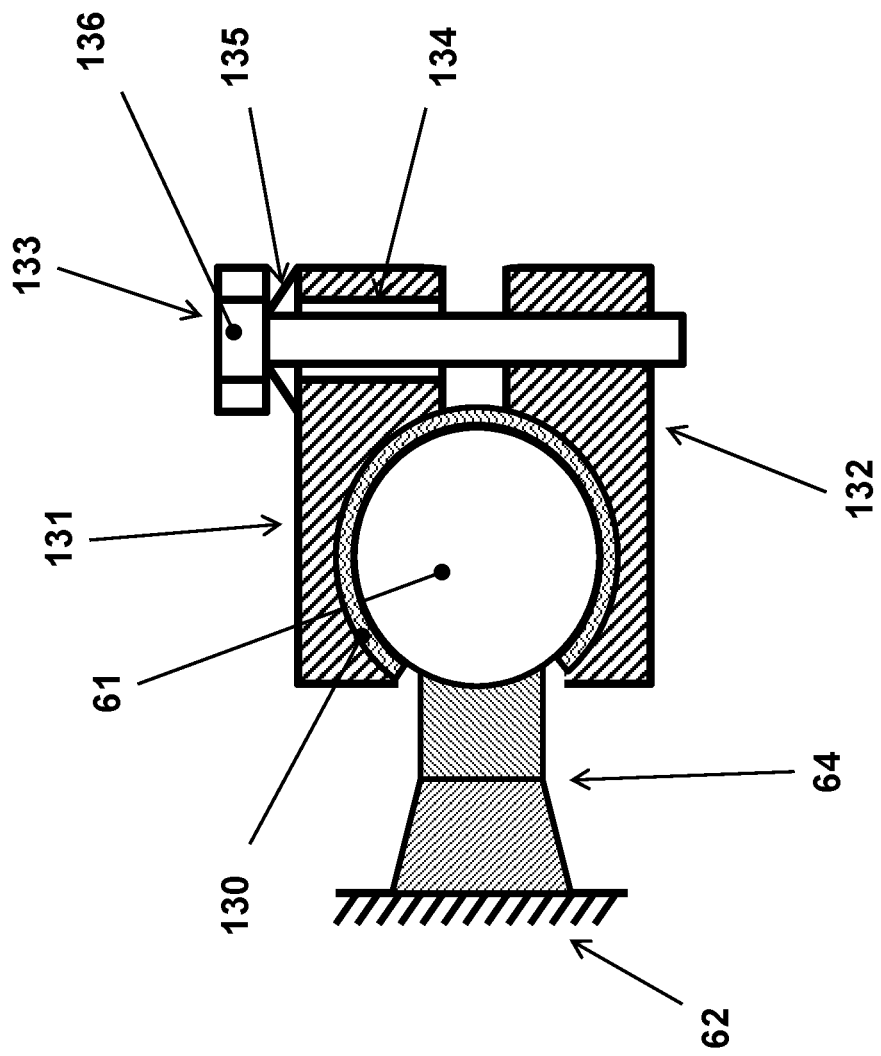
FIG. 13 illustrates the cross-sectional view D-D of FIG. 12 showing the configuration of a braking member of the braking mechanism of FIG. 12.

The cross-sectional view D-D, FIG. 12, is shown in FIG. 13, where as can be seen, the braking mechanism consists of members 131 and 132, which are used to apply pressure to the brake lining 130 provided between the members 131 and 132 and the rail 61. The pressure on the brake lining is provided and adjusted by the bolt 133, which as can be seen in FIG. 13, is passed through the hole 134 in the member 131 and screwed to the threaded section in the member 132. In practice, at least one Belville washer 135 or the like is provided between the head 136 of the bolt 133 and the surface of the member 131 as shown in FIG. 13 to ensure that the brake pressure is maintained at the adjusted level.

Figure 15:
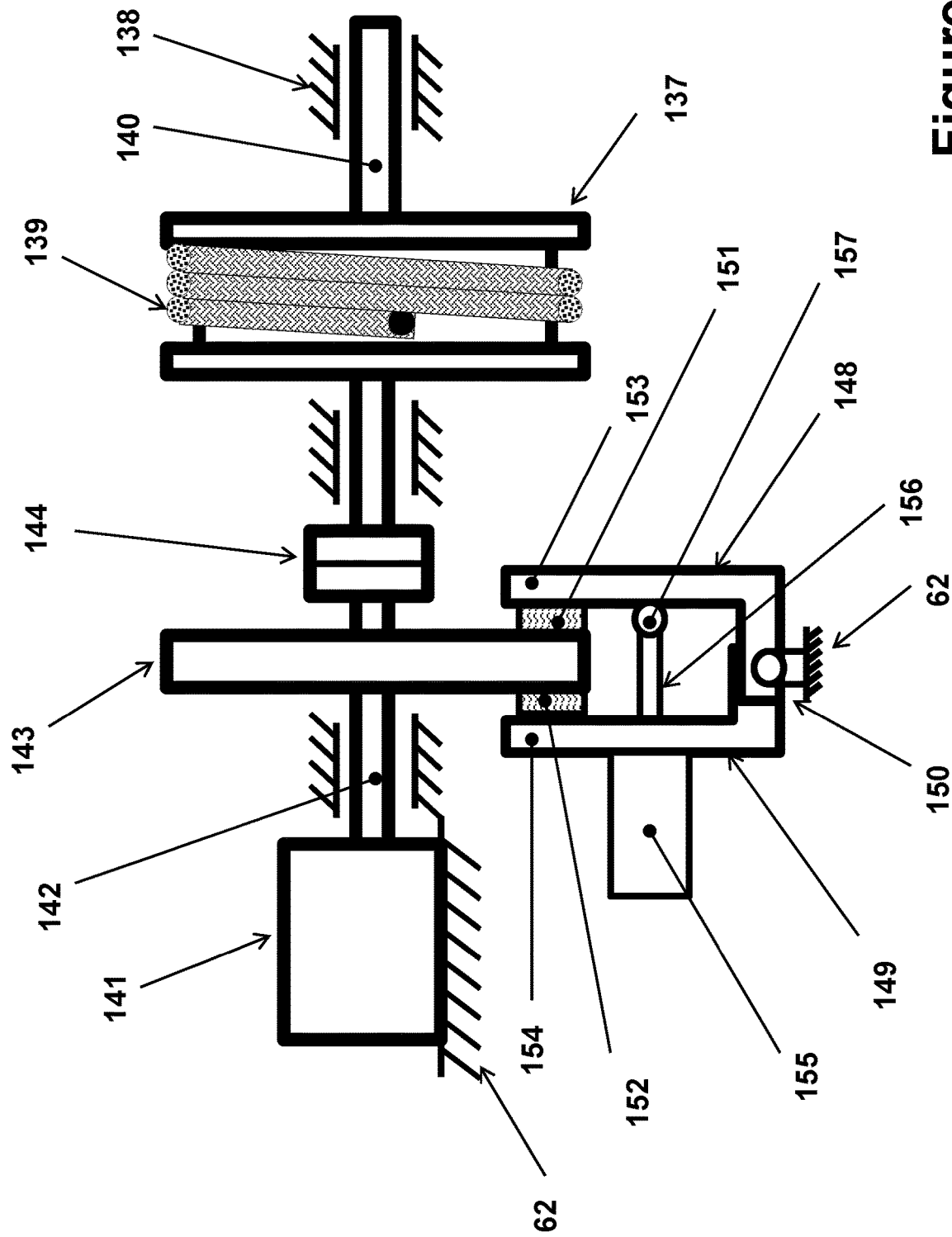
FIG. 15 illustrates the view "E" of the carriage stopping mechanism of the embodiment of FIG. 14.

In another embodiment shown in FIGS. 15 and 16, the mechanical acceleration profile event simulating shock testing machine of the embodiment 60 type (FIGS. 5 and 6A-6C) is provided with a mechanism to apply a controlled decelerating force to the carriage 63 to bring it to a controlled stop. In this embodiment, the carriage accelerating portion of the testing machine is identical to that of the embodiment 60 of FIG. 5 with the wheel 69 drive mechanisms of FIG. 6A or 6B or 6C.

To perform an acceleration test, the carriage 63 is accelerated with the prescribed acceleration profile by the required rotational acceleration of the wheel 69 and the resulting pulling of the carriage by the cable 66 as was previously described for the embodiment 60 of FIG. 5 with the wheel 69 drive mechanisms of FIG. 6A or 6B or 6C. In the meanwhile, the cable 138 is unwounded from the wheel 137, which like the wheel 60 is attached to the machine structure via the shaft 140 running in the bearing 138, FIGS. 14 and 15. While the carriage 63 is being accelerated with the prescribe acceleration profile, the electric motor 141 would provide at least part of the torque required to rotate the wheel 137 so that minimal or no force would be required to be exerted by the carriage 63 to pull the cable 139 along. Similar to the cable 66, the cable 139 is also attached to the carriage 63 via its support member 68. The motor 141 drives the wheel 137 via the shaft 142, which is connected to the wheel shaft 140 by the clutch member 144. A brake disk 143 may also be provided on the shaft 142 to provide braking force for decelerating the carriage 63 as is described later.

Figure 14:
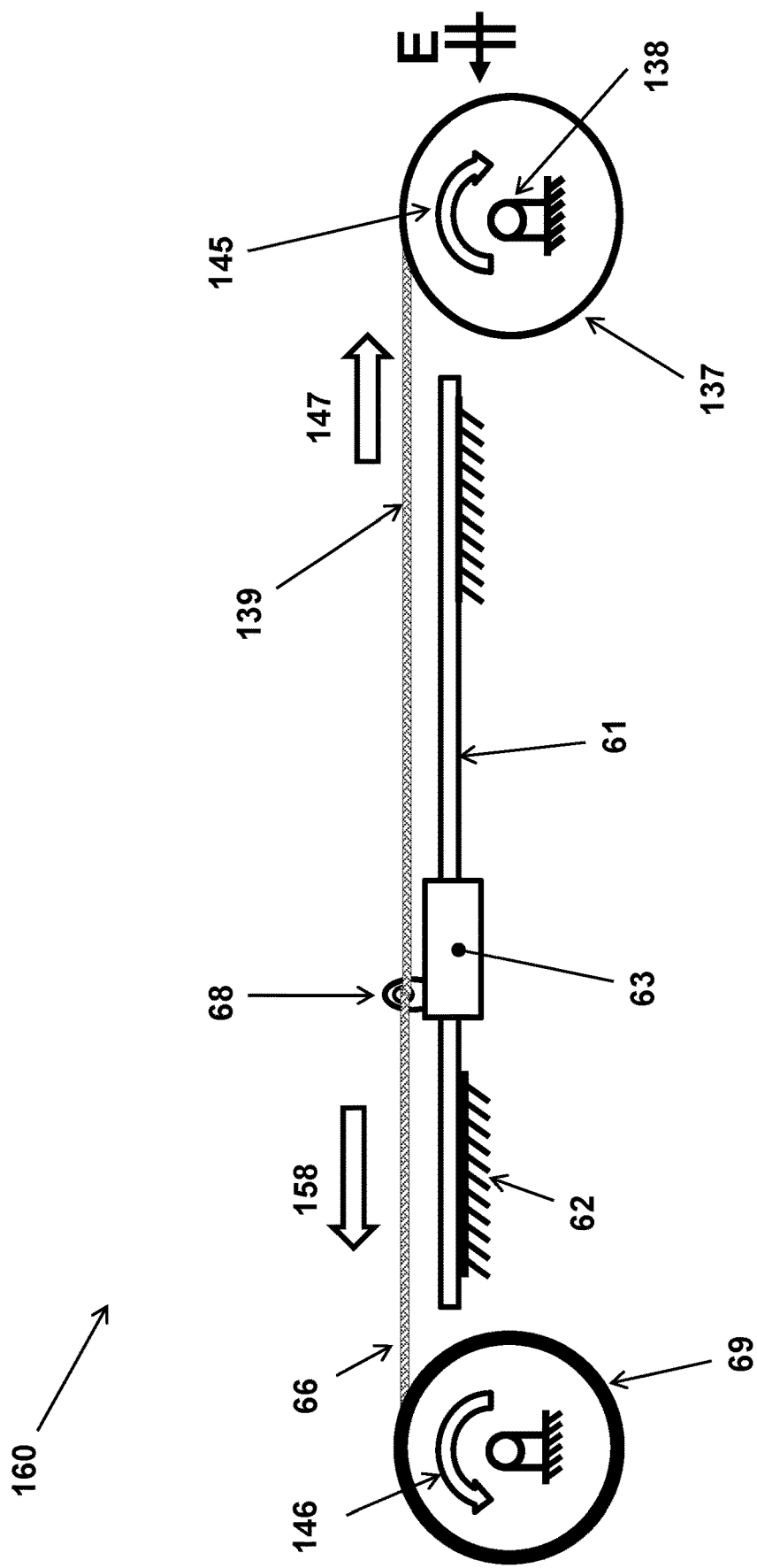
FIG. 14 illustrates another mechanism for stopping the carriage components of the embodiments of FIGS. 5 and 6A-6C at the completion an acceleration test.

Then at the completion of the applied prescribed acceleration to the carriage 63 and usually after separation of the cable 66 from the carriage, the motor 141 is used to apply a torque to the wheel 137 in the direction of the arrow 145, FIG. 14, to apply a pulling force to the cable 139 in the direction of the arrow 147 and thereby to the carriage 63 at the support member 68 to cause it to decelerate and eventually be brought to a stop.

When the required carriage 63 deceleration rate to be provided by the electric motor 141 is not high, the electric motor alone can provide the decelerating toque alone. When the carriage 63 is to be decelerate at relatively high rates that is beyond the toque level that the electric motor 141 can provide, then a braking force that is applied to the disc brake 143 may also be employed.

In the embodiment of FIG. 15, a typical braking mechanism is shown to consist of links 148 and 149, which are attached to the machine structure 62 by a rotary joint 150. Brake pads 151 and 152 are also provided close to the tips 153 and 154, respectively, between the links 148 and 149 and the disc 143 as shown in FIG. 15. In the braking force is then provided by the actuator 154, which might be a pneumatic or hydraulic or an electrical type, all of which are well known in the art. The actuator 155 is configured to provide its actuating force by the connecting rod 156, which is attached to the opposite link 148 by a rotary joint 157.

The rotary motion of the motor 141 is preferably controlled by the same testing system controller 92, FIG. 8. A cable tension sensor (not shown) or the output of the accelerometer 90, FIG. 8, may be used to control the rotary motion of the motor 141.

It is also appreciated that unlike the embodiment 60 of FIG. 5, the mechanical acceleration profile event simulating shock testing machine embodiment 160 of FIG. 14 provides the capability of applying acceleration profiles to the carriage 63 and thereby to the objects being tested that may consist of acceleration and decelerations in the direction of its travel as shown by the arrow 158 in FIG. 14. For this reason, it is highly desirable that the motion of the electric motors driving the wheels 69 and 137 be controlled with one control unit and using the same accelerometer as sensory input, for example, control unit 92 and accelerometer sensor 90 shown in the testing system of FIG. 8.

It is appreciated that in all mechanical acceleration profile event simulating shock testing machine of the embodiment 60 type (FIGS. 5 and 6A-6C), a shock absorber is always provided at the end of the rails 61 so that if the carriage 63 is not brought to a stop due to certain user miscalculations or other accidental events, the carriage 63 would not leave the confinement of the machine and disengage from the rails.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A shock testing machine comprising:
   a carriage for holding a component to be tested, the carriage being configured to be movable in a linear direction along one or more elongated rails;
   a drum rotatable on a shaft, the drum having a circumferential surface;
   a cable having one end connected to the carriage and an other end connected to the drum;
   a motor having an output connected to the shaft to rotate the drum under the motive power of the motor to wind the cable on the circumferential surface of the drum;
   a clutch disposed in a power train operatively connecting the motor to the drum, the clutch having a disengaged state and an engaged state; and
   means for decelerating the carriage in the linear direction at a time after engagement of the clutch;
   wherein the means for decelerating comprises a release mechanism for releasing the cable from the carriage;
   the release mechanism comprises one or more cutting blades disposed on the carriage, the one or more cutting blades being configured to cut the cable at a predetermined distance traveled by the carriage after the clutch is engaged; and
   the clutch is controlled to disengage while the motor reaches a predetermined rotational speed or predetermined rotational torque and to engage when the motor reaches the predetermined rotational speed or predetermined rotational torque to accelerate the carriage and component to be tested in the linear direction.

2. The shock testing machine of claim 1, further comprising a controller for controlling the disengagement and engagement of the clutch when the motor reaches the predetermined rotational speed or predetermined rotational torque.

3. The shock testing machine of claim 2, further comprising an acceleration sensor disposed on the carriage, the controller being configured to control the motor based on a detection result from the acceleration sensor.

* * * * *